United States Patent
Magali

(10) Patent No.: US 9,018,864 B2
(45) Date of Patent: Apr. 28, 2015

(54) REBOUND-EFFECTOR

(76) Inventor: Hadar Magali, Breda (NL)

( * ) Notice: Subject to any disclaimer, the term of this patent is extended or adjusted under 35 U.S.C. 154(b) by 919 days.

(21) Appl. No.: 13/130,298

(22) PCT Filed: Nov. 19, 2009

(86) PCT No.: PCT/NL2009/000225
§ 371 (c)(1),
(2), (4) Date: Jul. 22, 2011

(87) PCT Pub. No.: WO2010/059036
PCT Pub. Date: May 27, 2010

(65) Prior Publication Data
US 2011/0304284 A1    Dec. 15, 2011

(30) Foreign Application Priority Data
Nov. 21, 2008 (WO) ............... PCT/NL2008/000255

(51) Int. Cl.
*H02K 41/02* (2006.01)
*H02K 33/16* (2006.01)
*G01V 1/155* (2006.01)
*B06B 1/12* (2006.01)

(52) U.S. Cl.
CPC .. *G01V 1/155* (2013.01); *B06B 1/12* (2013.01)

(58) Field of Classification Search
CPC ... H02K 41/0356; H02K 41/02; H02K 33/12; H02K 1/34; H02K 33/00; H02K 33/16; H02P 25/027; H02P 25/06; H02P 6/006
USPC ............... 318/119, 135, 686, 687, 38
See application file for complete search history.

(56) References Cited

U.S. PATENT DOCUMENTS

| 3,260,273 | A   |   | 7/1966  | Hayner |
|-----------|-----|---|---------|--------|
| 4,336,745 | A   | * | 6/1982  | Lund ................................ 91/35 |
| 5,128,908 | A   |   | 7/1992  | Reust |
| 6,044,710 | A   | * | 4/2000  | Kurita et al. .................... 73/664 |
| 6,269,733 | B1  | * | 8/2001  | Reust ............................... 91/415 |
| 6,977,474 | B2  | * | 12/2005 | Ueda et al. .................... 318/128 |

FOREIGN PATENT DOCUMENTS

WO    2005087393    9/2005

OTHER PUBLICATIONS

International Search Report for related PCT Application No. PCT/NL2009/000225 dated Apr. 13, 2010.

* cited by examiner

*Primary Examiner* — Bentsu Ro
(74) *Attorney, Agent, or Firm* — Troutman Sanders LLP; Ryan A. Schneider; Daniel T. Sharpe

(57) ABSTRACT

A Rebound-Effector is a mechanism which runs a weight forth and back, by high acceleration. As the weight accelerates, a rebound force is built up. This force is proportional to the product of the weight and the acceleration, and is in opposite direction to the acceleration vector. The Rebound-Effector has four operational phases. The energy inserts into the system, during the first phase, accelerates the weight to the same direction as the movement, being converted into kinetic energy. This kinetic energy is taken back during the second phase, while slowing down the weight, and stored. During the third phase, the stored energy accelerates the weight to the same moving direction, being converted into kinetic energy. This kinetic energy is taken back during the fourth phase, while slowing down the weight, and stored. Neglecting the friction and the non-ideal behavior of the energy conversion, the Rebound-Effector needs an external energy source just for compensating for the real, effective, physical work it performs.

19 Claims, 32 Drawing Sheets

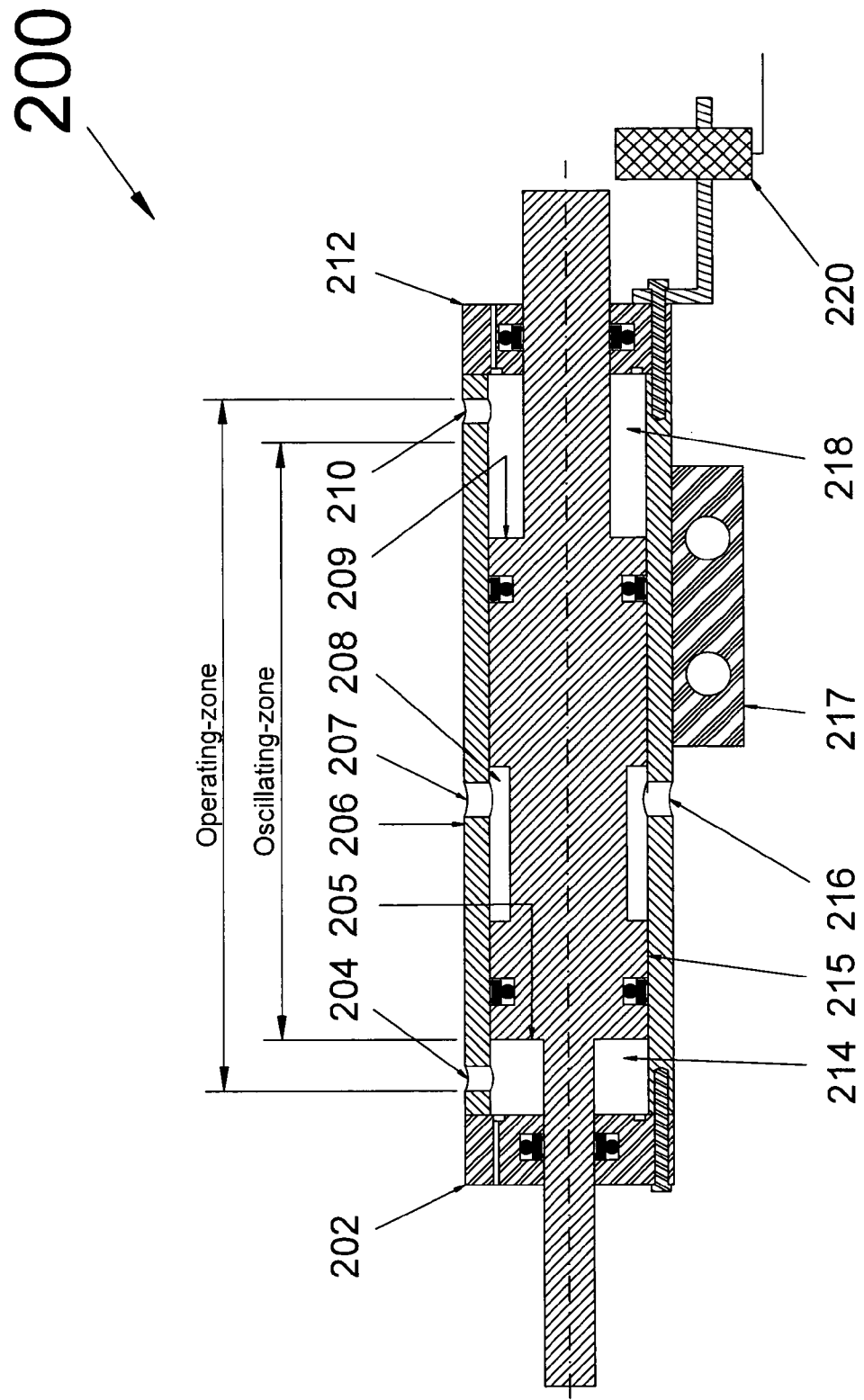

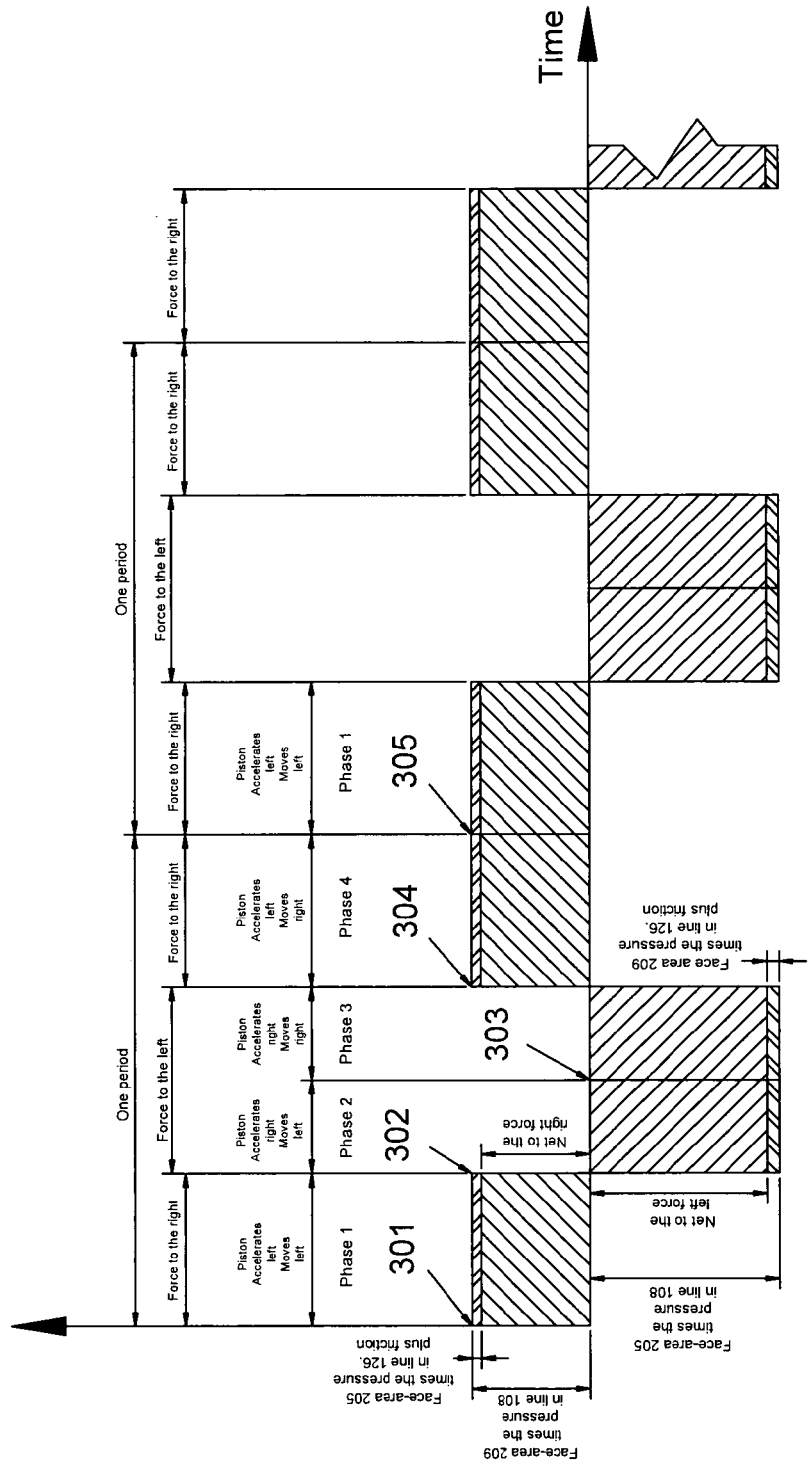

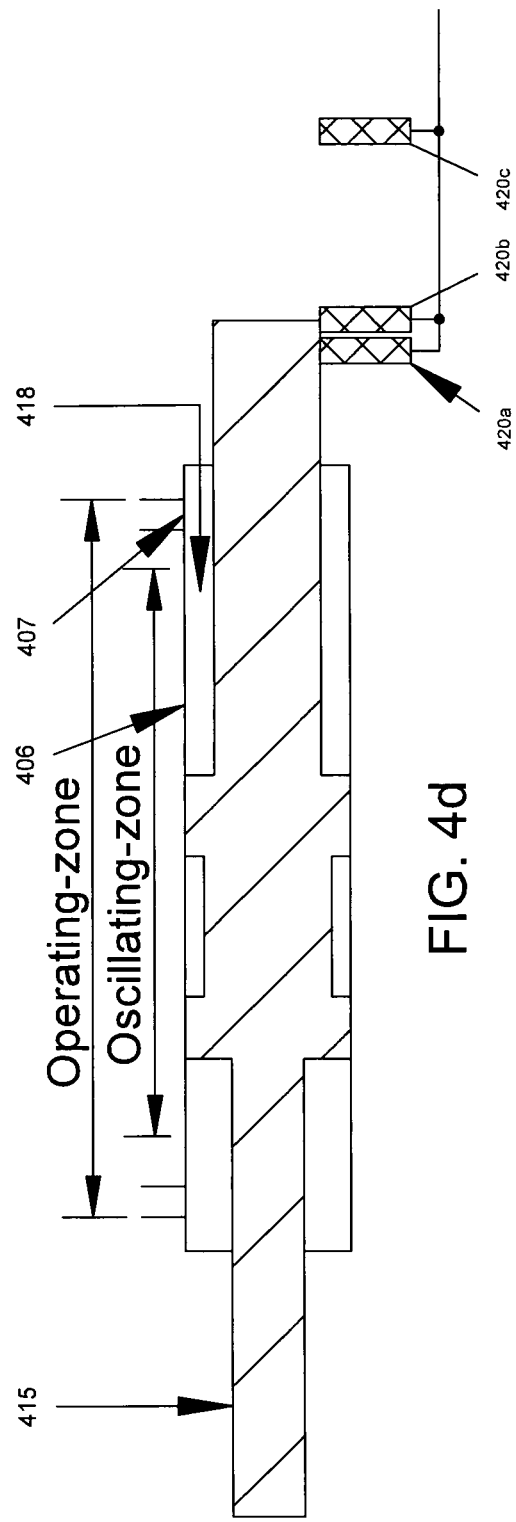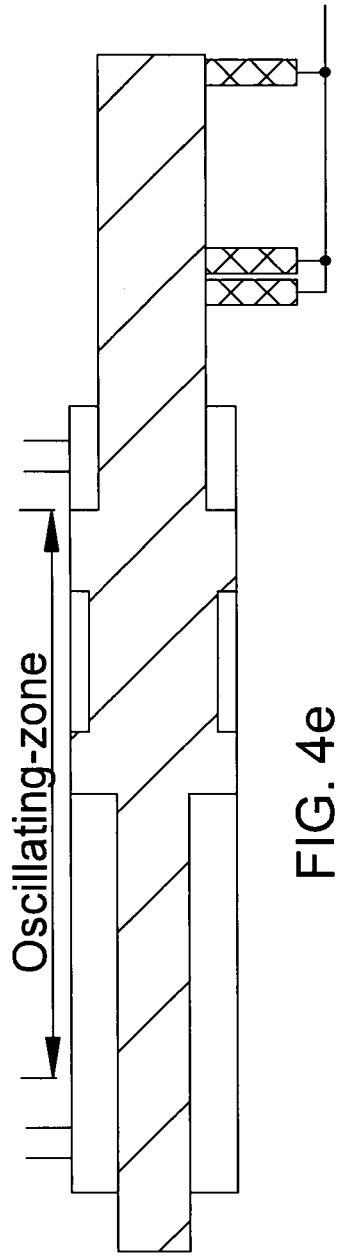
FIG. 4d
FIG. 4e

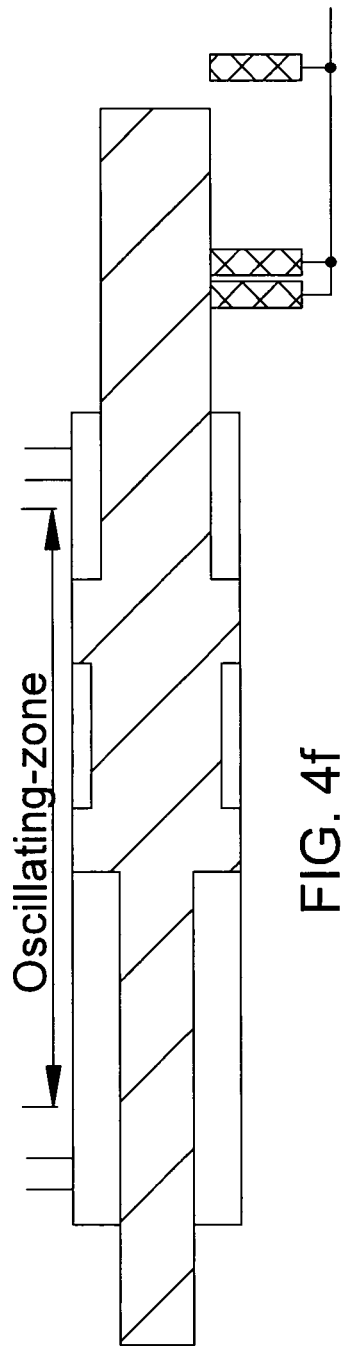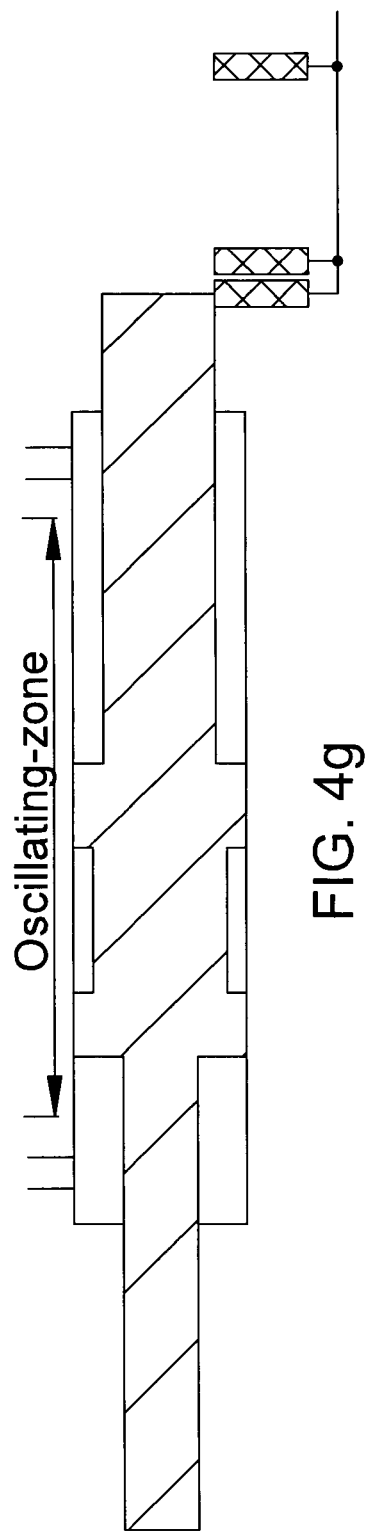

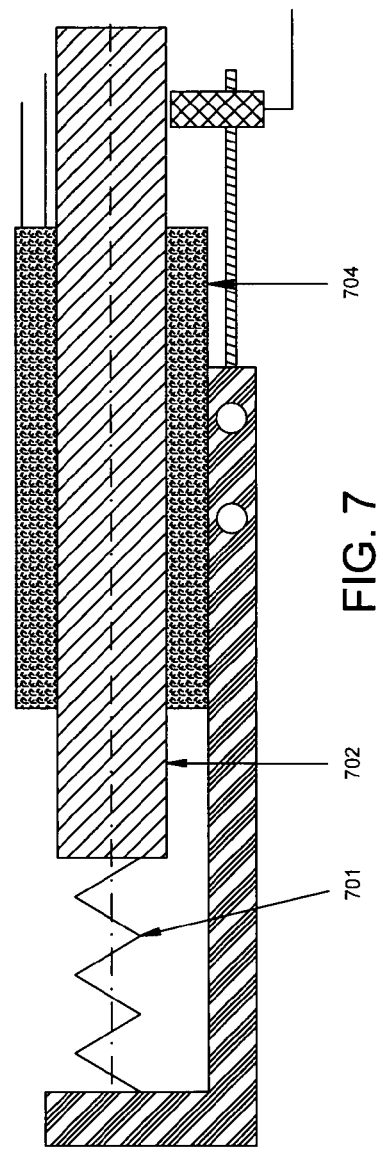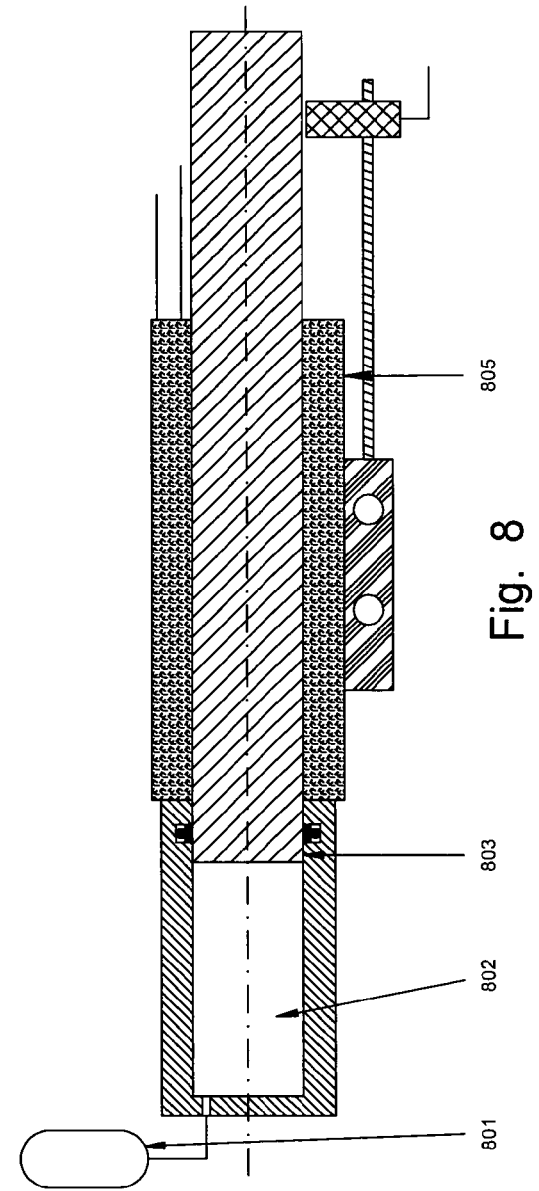

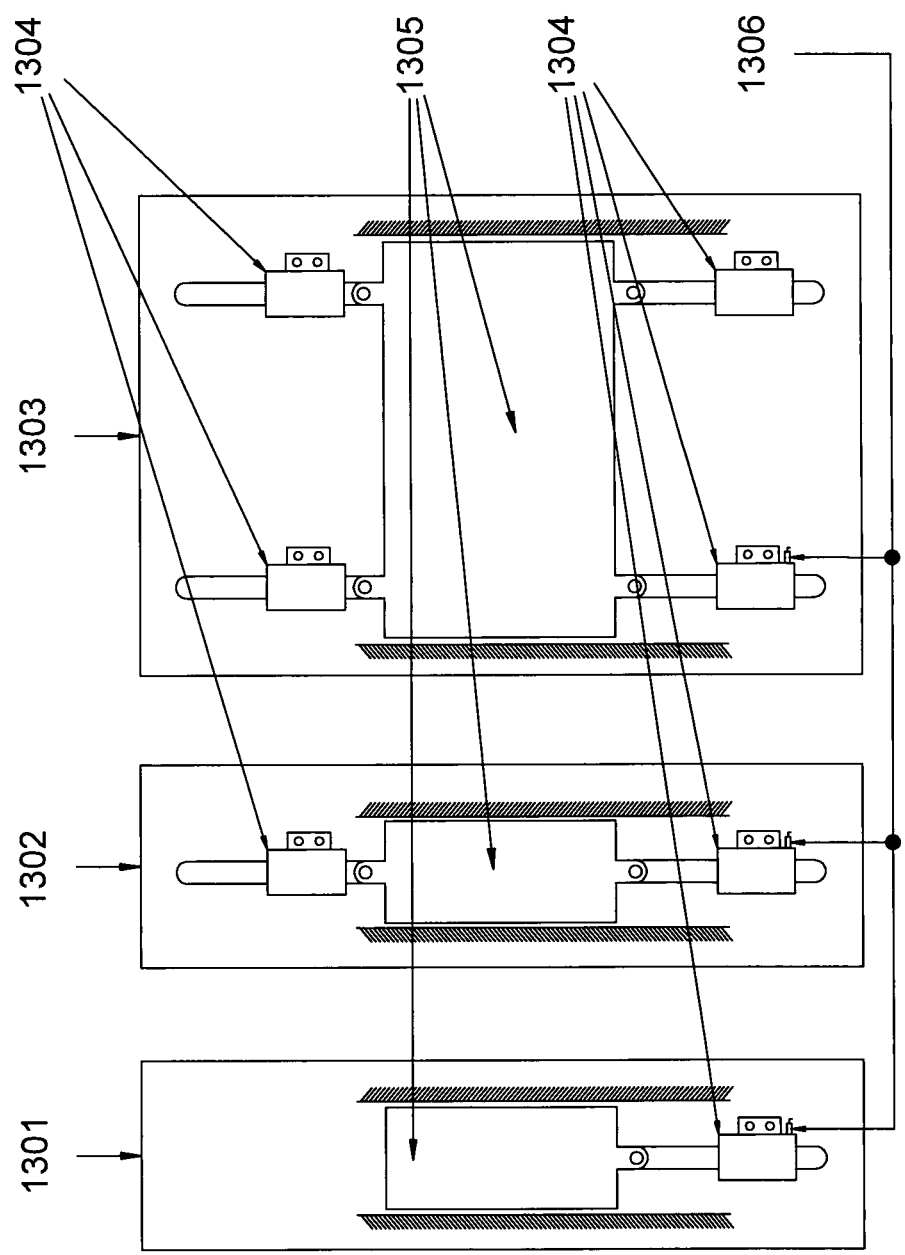

View A-A

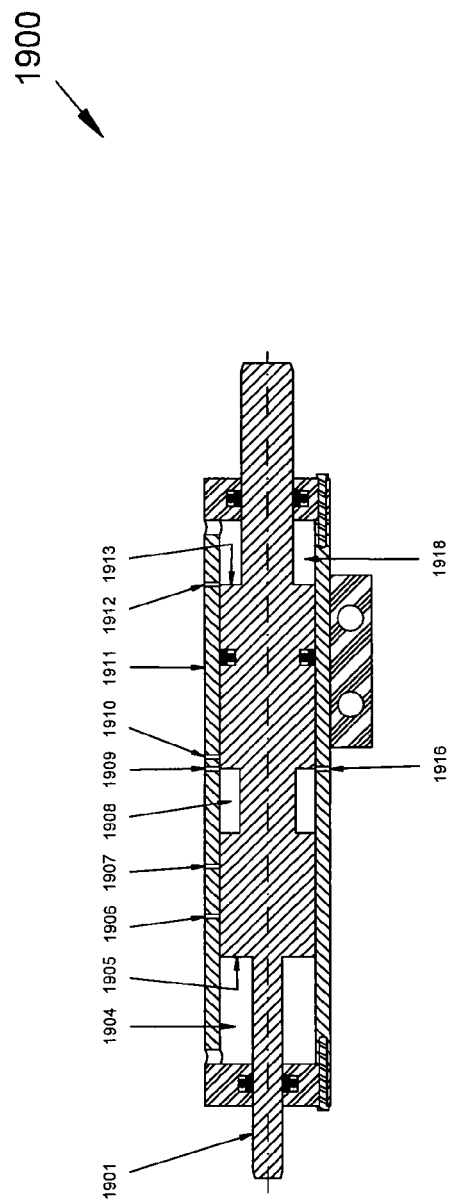
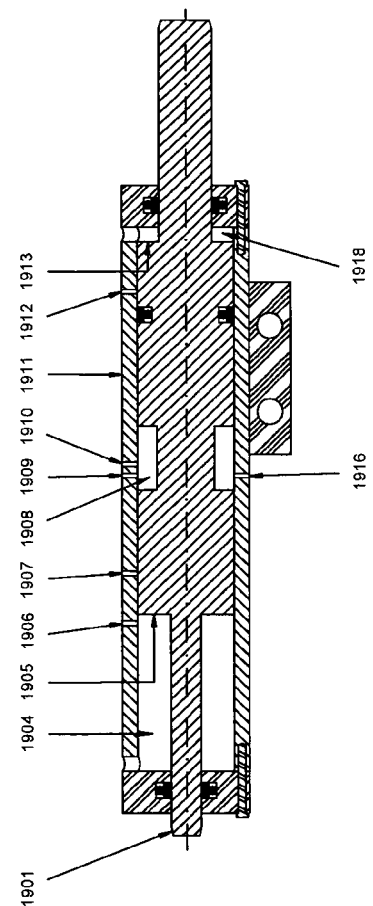
FIG. 19a
FIG. 19b

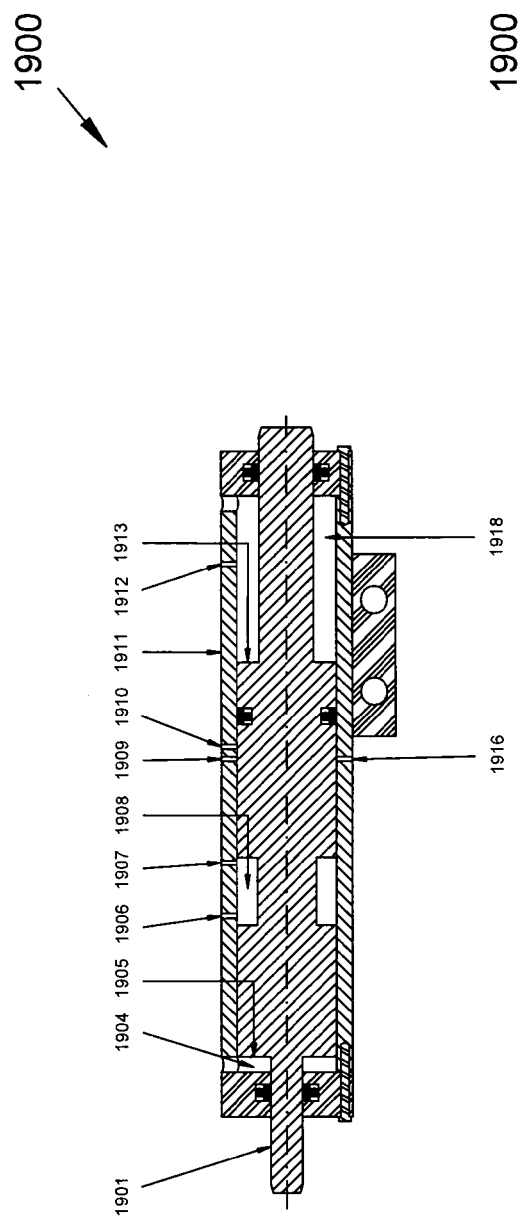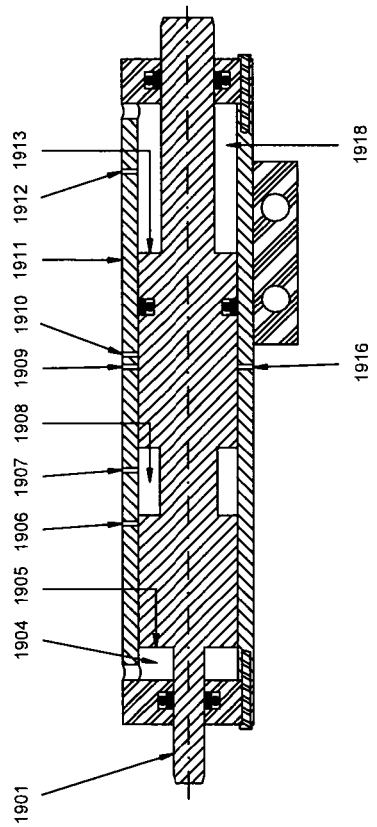
FIG. 19c
FIG. 19d

REBOUND-EFFECTOR

CROSS-REFERENCE TO RELATED APPLICATIONS

This application is a US National Stage of International Application No. PCT/NL2009/000225, filed 19 Nov. 2009, which claims the benefit of PCT/NL2008/000255, filed 21 Nov. 2008, both herein fully incorporated by reference.

FIELD OF THE INVENTION

The present invention relates to a Rebound-Effector which creates back and forth oscillating, periodic, with no reaction forces. The Rebound-Effector may be driven by virtually any energy source, and may have virtually any size. The potential use of the Rebound-Effector is as a locomotive for sensors, from nano to macro motors, medical tools, hand-held devices, industrial machinery, metal forming, crushing, breaking, demolishing, scraping, compacting, cutting, punching, pilling, vibrating, and load testing.

BACKGROUND OF THE INVENTION

First of all, an overview of related US background art is given in the following table, in which the US patent number is mentioned in the first column, the title/description of the patent is mentioned in the second column, the inventor is mentioned in the third column, and the publication date is mentioned in the fourth column.

| | | | |
|---|---|---|---|
| T104,801 | Vibrator Mass actuator Design | Rozycki, Marek L. | Nov. 6, 1984 |
| 3,159,233 | Seismic Transducer Construction | Clynch, F. | Dec. 1, 1964 |
| 3,262,507 | Driving and Extraction of Piles and/or Encasing Structures | Hansen, F. | Jul. 26, 1966 |
| 3,329,930 | Marine vibration Transducer | Cole, J. R | Jul. 4, 1967 |
| 3,384,868 | Marine Vibrator Device | Brown, G. L. | May 21, 1968 |
| 3,482,646 | Marine Vibrator Devices | Brown, G. L. | Dec. 9, 1969 |
| 3,529,681 | Hydraulically Controlled Vibro-Hammer | Berrie, E. G. | Sep. 22, 1970 |
| 3,704,651 | Free Piston Power Source | John J. Kupka | Dec. 5, 1972 |
| 3,745,885 | Hydraulic Vibrator | Fair, Delbert W. | Jul. 17, 1973 |
| 3,934,673 | Vibrator Systems for Generating Elastic Waves in the Earth | Silverman, Daniel | Jan. 27, 1976 |
| 4,106,586 | Hydraulic Vibrator | Stafford, Jay H. | Aug. 15, 1978 |
| 4,178,838 | Oil Porting System for Dual Cylinder Vibrator | Stafford, Jay H. | Dec. 18, 1979 |
| 4,143,736 | Seismic Transducer Construction | Fair, Delbert W. | Mar. 13, 1979 |
| 4,248,324 | Seismic Vibrator and Method for Improving the output of a Seismic Vibrator | Mifsud, Joseph F. | Feb. 3, 1981 |
| 4,314,365 | Acoustic Transmitter and Method to produce essentially longitudinal, Acoustic Waves | Peterson, Clifford W. | Feb. 2, 1982 |
| 4,442,755 | Power Stage Servo Valve for a Seismic Vibrator | Rozycki, Marek L. | Apr. 17, 1984 |
| 4,608,675 | Land Seismic Source Method and Apparatus | Chelminski, Stephen V. | Aug. 26, 1986 |
| 4,650,008 | Pile Driver and Extractor | Simson, Dionizy | Mar. 17, 1987 |
| 4,675,563 | Reciprocating Linear Motor | Goldowsky, Michael P. | Jun. 23, 1987 |
| 4,658,930 | Vibrator for Seismic Geophysical Prospecting | Bird, James M. | Apr. 21, 1987 |
| 4,785,430 | Hydraulic Vibrator with Wide Dynamic Range | Cole, Jack H. | Nov. 15, 1988 |
| 4,845,996 | Test System for Caissons and Piles | Bermingham, Patrick | Jul. 11, 1989 |
| 5,038,061 | Linear Actuator/Motor | Olsen, John H. | Aug. 6, 1991 |
| 5,090,485 | Pile Driving using a Hydraulic Actuator | Pomonik, George M. | Feb. 25, 1992 |
| 6,323,568 | Electromagnetic Vibrator and Pump including same | Zabar, Nahum | Nov. 27, 2001 |
| 6,351,089 | Control System for a Linear Vibration Motor | Ibuki, Yasuo | Feb. 26, 2002 |
| 6,653,753 | Linear Motor | Kawano, Shinichiro | Nov. 25, 2003 |
| 6,765,318 | Linear Driving Device | Sawada, Kiyoshi | Jul. 20, 2004. |
| 6,977,474 | Control System for a Linear Vibration Motor | Ueda, Mitsuo | Dec. 20, 2005 |
| 7,005,810 | Motor Driving Apparatus | Ueda, Mitsuo | Feb. 28, 2006 |
| 7,049,925 | Linear Actuator | Kawano, Shinichiro | May 23, 2006 |
| 7,071,584 | Linear Motor | Kawano, Shinichiro | Jul. 4, 2006 |
| 7,148,636 | Motor Drive Control Apparatus | Ueda, Mitsuo | Dec. 12, 2006 |
| 7,151,348 | Motor Driving Apparatus | Ueda, Mitsuo | Dec. 19, 2006 |

The most popular use of back and forth oscillating weight is for seismic purposes. Those oscillators induce pressure or shear waves into the ground, having 2-1,000 millisecond time period duration. The seismic oscillators were specially developed for geophysics use. The output has to be applied for a short time, having clear sinusoidal shape. As the duty time is short, the design does not have to take care of the centering of the weight along the displacement zone, not for the energy consumption, nor for the heat produced.

The disadvantages of the seismic oscillator as a production tool are high energy consumption, a lot of heat production, a need for a very complicated control system, a short duty time, no option for asymmetric forces, no option for alternating active "left" and active "right" forces, no option for rectangular-shaped forces, and no option for immediate stop.

U.S. Pat. No. 3,159,233 Dec. 1, 1964 by F. Clynch, and
U.S. Pat. No. 3,329,930 Jul. 4, 1967 by J. R. Cole, and
U.S. Pat. No. 3,384,868 May 21, 1968 by G. L. Brown, and
U.S. Pat. No. 3,482,646 Dec. 9, 1969 by G. L. Brown, and
U.S. Pat. No. 3,745,885 Jul. 17, 1973 by Fair, and
U.S. Pat. No. 3,934,673 Jan. 27, 1976 by Silverman, and
U.S. Pat. No. 4,106,586 Aug. 15, 1978 by Stafford, and
U.S. Pat. No. 4,178,838 Dec. 18, 1979 by Stafford, and
U.S. Pat. No. 4,143,736 Mar. 13, 1979 by Fair, and
U.S. Pat. No. 4,248,324 Feb. 3, 1981 by Mifsud, and
U.S. Pat. No. 4,314,365 Feb. 2, 1982 by Petersen, and
U.S. Pat. No. 4,442,755 Apr. 17, 1984 by Rozycki, and
U.S. Pat. No. T104,801 Nov. 6, 1984 by Rozycki, and
U.S. Pat. No. 4,608,675 Aug. 26, 1986 by Cheimiski, and
U.S. Pat. No. 4,658,930 Apr. 21, 1987 by Bird, and
U.S. Pat. No. 4,785,430 Nov. 15, 1988 by Cole
are all related to the developments and improvements of the seismic vibrators. All those patents use forth and back accelerated weight to produce a sinus-shaped force. This force is introduced to the ground in order to build up seismic waves.

The disadvantages of the above-described apparatuses, and methods, as seen in view of a general purpose, useful, productive tool are:

They have no capacity to produce rectangular force, nor asymmetric forces.
They do not recover driving energy.
They are heavy relative to the produced force.
They do not have immediate stop.
They do not have emergency stop.
They do not have a way to detect out-of-range weight position.
They do not have a way to prevent out-of-range weight position.
They do not have the capacity to switch from a stronger force to the "left" to a stronger force to the "right".
They are only capable of very short time continuously running.

U.S. Pat. No. 6,351,089 B1 Feb. 26, 2002 by Ibuki, and
U.S. Pat. No. 6,977,474 B2 Dec. 20, 2005 by Ueda, and
U.S. Pat. No. 7,005,810 B2 Feb. 28, 2006 by Ueda, and
U.S. Pat. No. 7,148,636 B2 Dec. 12, 2006 by Ueda, and
U.S. Pat. No. 7,151,348 B1 Dec. 19, 2006 by Ueda
are all related to the control systems for a linear motor. The target of those patents is to run the linear motor in such a way that the last will produce an accurate sinus force wave having the capacity to sweep the frequency.

The disadvantages of the above-described apparatuses, and methods, as seen in view of a general purpose, useful, productive tool are:
They are complicated, delicate, expensive, and need a lot of maintenance and special care.
They have no capacity to control asymmetric force.
They do not have the capacity to recover driving energy.
They do not have the capacity to control immediate stop.
They do not have a way to prevent out-of-range weight position.
They do not have the capacity to control switching from a stronger force to the "left" to a stronger force to the "right".

U.S. Pat. No. 3,262,507 Jul. 26, 1966 by Hansen, and
U.S. Pat. No. 3,529,681 Sep. 22, 1970 by Berrié, and
U.S. Pat. No. 3,704,651 Dec. 5, 1972 by Kupka, and
U.S. Pat. No. 4,650,008 Mar. 17, 1987 by Simson, and
U.S. Pat. No. 4,845,996 Jul. 11, 1989 by Bermingham, and
U.S. Pat. No. 5,090,485 Feb. 25, 1992 by Pomonik
are related to pile driving devices.

A lot of efforts are invested in searching for a pile driver, or a pile vibrator, which will be based on the force produced by back and forth oscillating, accelerated weight. For the time being, none of the initiatives commercially functions. U.S. Pat. No. 4,845,996 Jul. 11, 1989 by Bermingham, which discloses actually one single stroke hammer, successfully functions as a load supply for pile loading test (Statnamic), and as a one single stroke pile driver for special off shore applications.

The apparatuses and methods which are described by U.S. Pat. No. 3,262,507 Jul. 26, 1966 by Hansen, and U.S. Pat. No. 3,529,681 Sep. 22, 1970 by Berrié, and U.S. Pat. No. 4,650,008 Mar. 17, 1987 by Simson, have no connection in between the position of the weight, and the pilot valve, or the driving pump. By short time of operation, the weight will exceed the designed oscillating zone, and hit the top, or the bottom, of the cylinder. The control of the weight movement is very difficult, and even non-realistic. Those apparatuses and methods have no capacity to produce asymmetric forces, and rectangular-shaped forces. They have no out-of-range stop, and no capacity to switch from a stronger "left" force to a stronger "right" force and vice versa, and they have high energy consumption.

U.S. Pat. No. 3,704,651 Dec. 5, 1972 by Kupka describes a free piston-based vibrator. The device has passive valves and therefore cannot recover driving energy, cannot produce a rectangular-shaped force, nor can have asymmetric forces. It has no way for immediate stop. The overall efficiency, by energy, and by the induced forces, of the device is low.

U.S. Pat. No. 5,090,485 Feb. 25, 1992 by Pomonik cannot be realized. There is no way to create out of back and forth weight accelerating a continue series of half sinus force waves having the same direction. Physics dictates that after a "left" force, there must be a "right" force, and so on. This apparatus and method does not include any connection in between the position of the weight, and the control of the servo valve—thus synchronization in between them both is virtually non available. This apparatus and method have no capacity to produce asymmetric forces, rectangular forces, active "left" to active "right" switching, energy recovery, out-of-range weight movement preventing, and immediate stop.

U.S. Pat. No. 4,675,563 Jun. 23, 1987 by Goldowski, and
U.S. Pat. No. 5,038,061 Aug. 6, 1991 by Olsen, and
U.S. Pat. No. 6,323,568 B1 Nov. 27, 2001 by Zabar, and
U.S. Pat. No. 6,653,753 B1 Nov. 25, 2003 by Kawano, and
U.S. Pat. No. 6,765,318 B2 Jul. 20, 2004 by Sawada, and
U.S. Pat. No. 7,049,925 B2 May 23, 2006 by Kawano, and
U.S. Pat. No. 7,071,584 B2 Jul. 4, 2006 by Kawano
disclose improvements of small electric driven linear motors or linear actuators, which have no capacity to produce asymmetric forces, rectangular-shaped forces, active "left" and active "right" switch, energy reuse, and immediate stop. They are all limited in power, and in duty cycle.

SUMMARY OF THE INVENTION

The present invention provides a realistic method and apparatuses for creating rebound, periodic, alternating force from reciprocating accelerated weight.

The present invention provides a realistic source for a new kind of force—alternated, not harmonic, nor symmetric. Most of the times, the force has a rectangular, asymmetric shape.

The present invention provides environment-friendly apparatuses producing high forces, consuming low energy, and creating low acoustic noise.

The present invention provides a method and apparatuses which produce high forces out of relatively light weights.

The present invention provides a method and apparatuses which may be switched from being active "left" to active "right".

The present invention provides a method and apparatuses which may have controlled stop, emergency stop, immediate start, and immediate stop.

The present invention provides a method and apparatuses which can be driven by virtually any commercial energy source.

The present invention provides a method and apparatuses which can be realized by very small to very big devices.

The present invention provides a method and apparatuses which can be applied to virtually any discipline.

BRIEF DESCRIPTION OF THE DRAWINGS

FIG. 2a, FIG. 2b, FIG. 2c, FIG. 2d, FIG. 2e, FIG. 2f, and FIG. 2g show a cross-section of the piston-cylinder position sensor assembly, with different positions of the piston relative to the cylinder.

FIG. 3a, FIG. 3b, FIG. 3c, and FIG. 3d are forces versus time graphs of a Rebound-Effector in two operating modes.

FIG. 4d, FIG. 4e, FIG. 4f, and FIG. 4g schematically show the positions of the piston, and the position sensor which is realized by three proximity switches.

FIG. 7 is a schematic of an electric/mechanic-operated Rebound-Effector.

FIG. 8 is a schematic of an electric/pneumatic-operated Rebound-Effector.

FIG. 13 shows options of driving an external weight by a Rebound-Effector, or Rebound-Effectors.

FIG. 19a, FIG. 19b, FIG. 19c, FIG. 19d, and FIG. 19e are cross-sections of the piston-cylinder position sensor assembly, with different positions of the piston relative to the cylinder, for a hydraulic-driven, and hydraulic-controlled Rebound-Effector.

DETAILED DESCRIPTION OF EMBODIMENTS

The Rebound-Effector includes a weight and/or weights, which is, or are, accelerated forth and back in a periodic, oscillating manner. The movement of the weight or weights may be linear, rotary, or a combination of them both. In case of rotary movement of the weight, or weights, the direction of rotation is periodically changed from clockwise to anticlockwise and vice versa.

The acceleration of the weight, or weights, may have any shape, and may be changed in time. It is possible that the acceleration to one direction will be the same as to the other, opposite direction, or not the same.

The gain of the Rebound-Effector is the ratio between the rebound force, and/or rebound moment, and the weight of the weight, or weights, and/or the moment of inertia of the weight or weights. The acceleration is the gain of the Rebound-Effector. For a certain weight, or weights, and/or moment, or moments, of inertia, the acceleration determines the rebound force, and/or moment. According to the rule of Mr. Newton, the rebound force is the product of the weight, or weights, by the acceleration.

As an example, a weight which weighs 1 Ton or about 10 kN, and which accelerates at 50 g or about 500 m/sec$^2$, induces 50 Ton or about 500 kN of rebound force. In this case the gain of the Rebound-Effector is 50.

The Rebound-Effector creates back and forth oscillating forces, and/or moments. The force, and/or moment, to each direction, may be the same, or not the same. The time duration of the forces, and/or the moment, applying to each direction may be the same, or not the same.

Care has to be taken that the weight, or weights, will always travel just within the operating zone. The control loop has to ensure that, for each direction, and in any time the Rebound-Effector functions, all the kinetic energy has to be taken from the oscillating weight before reaching the end of the operating zone.

The driving energy for the Rebound-Effector may be hydraulic, electric, piezoelectric, magnetic, electromagnetic, mechanic, pneumatic, or any combination of them, but is not restricted thereto. In all cases, the driving energy is converted to kinetic energy. In most cases, at least a part of the kinetic energy is converted back to the driving energy.

Figure 1:
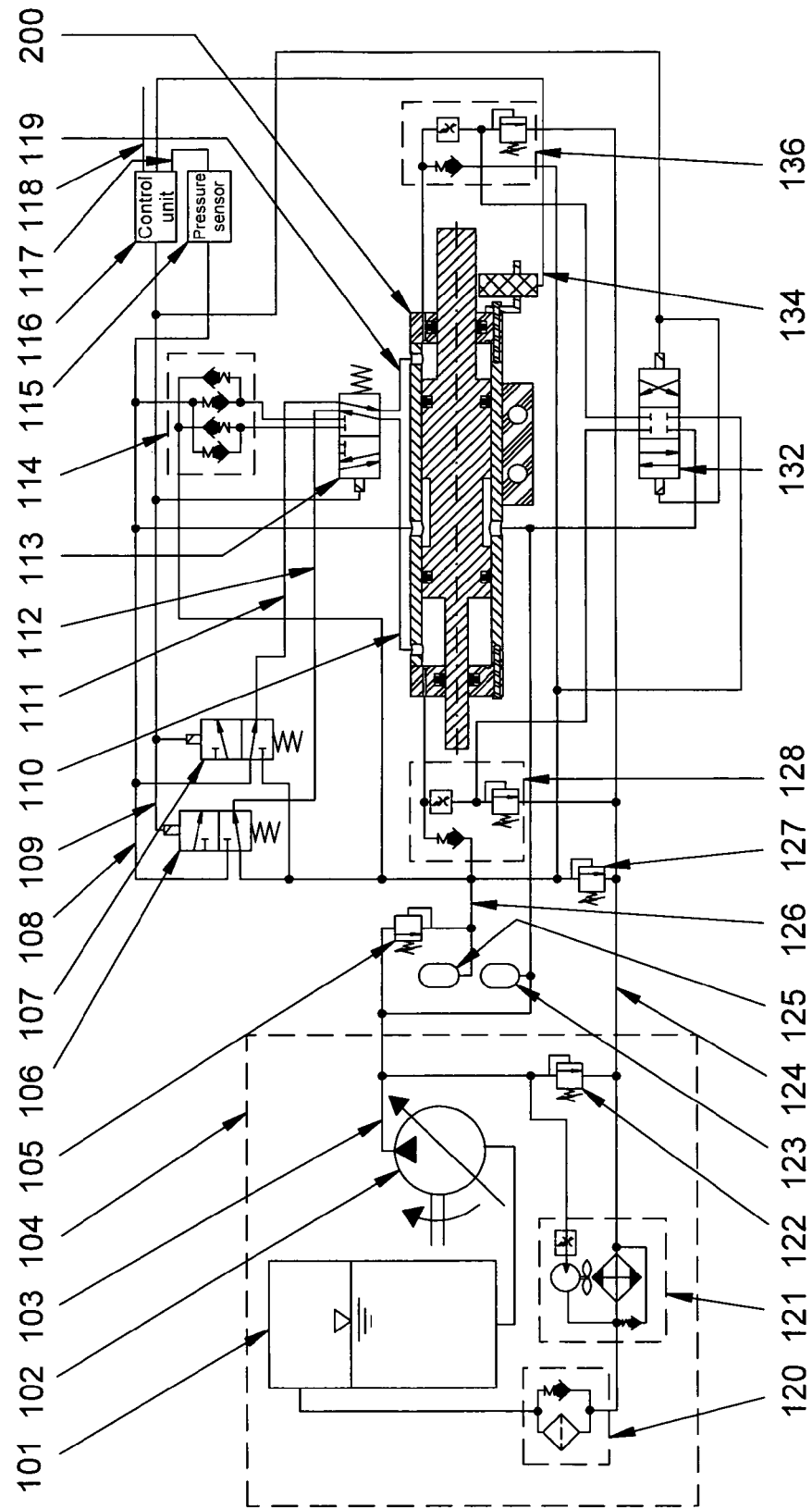
FIG. 1 is a schematic of a hydraulic-operated, electric-controlled Rebound-Effector system.

One option to realize the Rebound-Effector, driven by hydraulic pressurized fluid, and electrically controlled, is described by FIG. 1, FIG. 2a, FIG. 2b, FIG. 2c, FIG. 2d, FIG. 2e, FIG. 2f and FIG. 2g. Part 200 shown by FIG. 1 is the piston-cylinder position sensor assembly. This assembly is shown, with more details and different positions of the piston relative to the cylinder, by FIG. 2a, FIG. 2b, FIG. 2c, FIG. 2d, FIG. 2e, FIG. 2f and FIG. 2g.

In this case, the weight of the Rebound-Effector is a piston 215 which is oscillating while being accelerated to the left and to the right, inside a cylinder 206. The cylinder 206 is closed at both sides by covers 202 and 212. The piston 215 has a groove which, together with the cylinder 206, creates a first chamber 208. The piston 215, together with the cylinder 206 and a cover 202, creates a second chamber 214. The piston 215, together with the cylinder 206 and a cover 212, creates a third chamber 218. The cylinder 206 is connected to a support 217, which delivers the forces created by the Rebound-Effector to a driven object. A position sensor 220 is attached to the cylinder 206, or the support 217, and measures the location of the piston 215 relative to the cylinder 206, or to the support 217, and sends the information through a first cable 134 to a control unit 116.

A hydraulic pressure and flow supply power pack 104 contains common components like a fluid tank 101, a pump 102, a filter 120, a cooler 121, and a relief valve 122. The hydraulic pressure and flow supply power pack 104 is a common power pack. It may be a standalone unit, or part of another machine. The control of the pump 102 may be flow-based, pressure-based, or flow- and pressure-based. In the case of this specific description, pressure-based control for the pump 102 makes the design of the control unit 116 easier, and is therefore preferred. The hydraulic pressure and flow supply power pack 104 delivers pressurized fluid through a high-pressure line 103, and receives the return hydraulic fluid from the Rebound-Effector through a return line 124. In case the control unit 116 has to control the pump 102, there is a cable, or wireless communication, in between them both. The above cable, or wireless, is not shown by the drawings. The high-pressure line 103 is connected to a first accumulator 123, a first control valve 132, the first chamber 208 through a first port 216, and a regulator 105. The regulator 105 sets the minimum pressure in a line 126. A second relief valve 127 sets the maximum pressure in the line 126. The line 126 is connected to a second accumulator 125. Emergency-stop assemblies 128 and 136 serve in case of malfunction of one or more of the control related components—a second control valve 106, a third control valve 107, a fourth control valve 113, the control unit 116, and/or a check valves assembly 114.

Figure 2A:
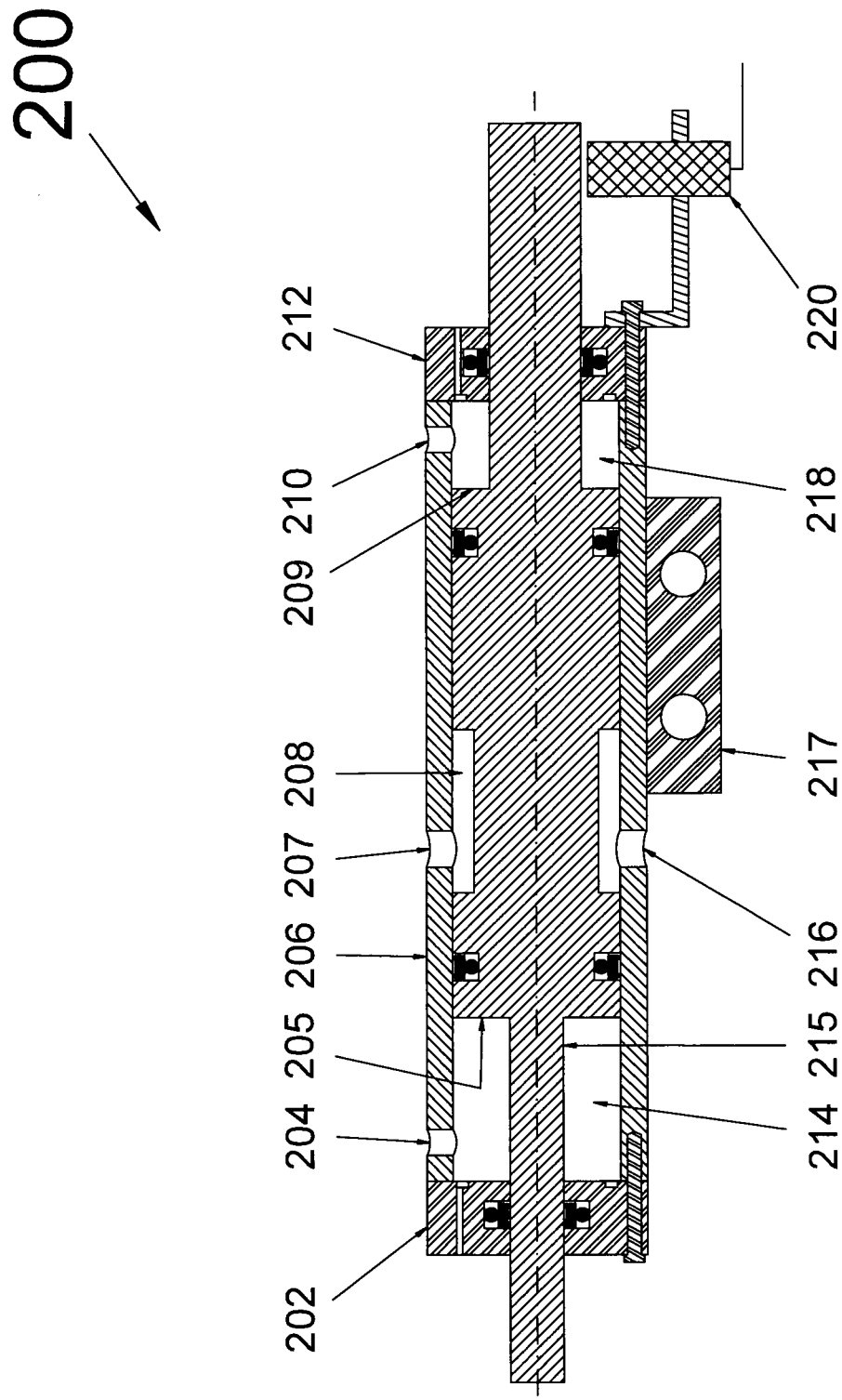
Figure 2B:
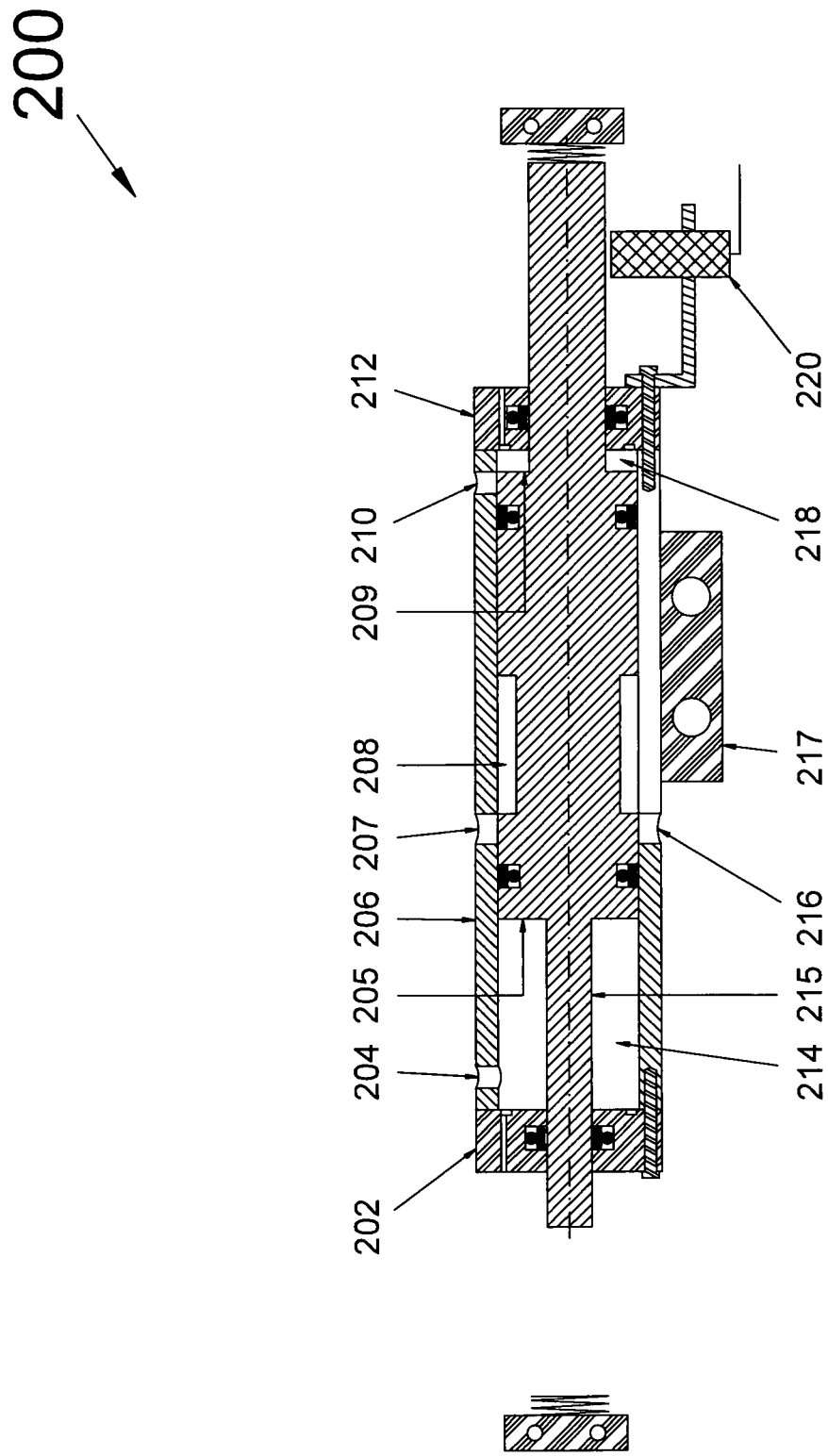

If the piston 215 is more to the right, relative to the cylinder 206, than its position as shown by FIG. 2b, and moves to the right, then the piston 215 blocks the first port 216, a second port 207, and a third port 210. The movement of the piston 215 to the right builds up pressure in the third chamber 218. Once the built-up pressure rises above the pre-set pressure of the relief valve in the second emergency-stop assembly 136, the hydraulic fluid flows from the third chamber 218 to the return line 124 through an orifice and the relief valve in the second emergency-stop assembly 136. In this case, the kinetic energy of the piston 215 is converted to heat by the orifice and the relief valve in the second emergency-stop assembly 136. At the same time, if the pressure in the second chamber 214 drops down below the pressure in the line 126, hydraulic fluid will flow from the line 126, through the check valve in the first emergency-stop assembly 128 to the second chamber 214.

Figure 2C:
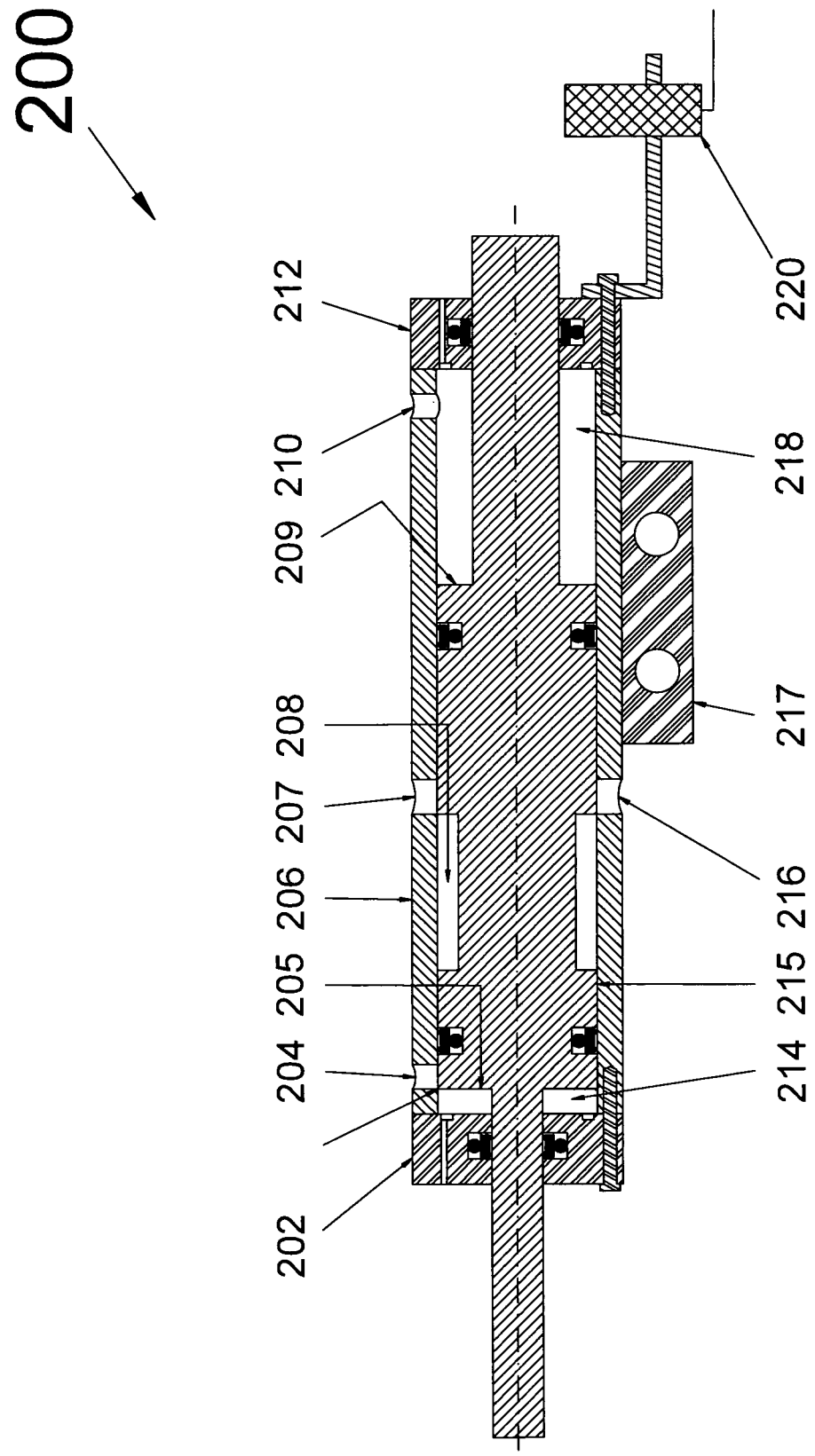

If the piston 215 is more to the left, relative to the cylinder 206, and its position is as shown by FIG. 2c, and moves to the left, then the piston 215 blocks a fourth port 204, the second port 207, and the first port 216. The movement of the piston 215 to the left builds up pressure in the second chamber 214. Once the built-up pressure rises above the pre-set pressure of the relief valve in the first emergency-stop assembly 128, the hydraulic fluid flows from the second chamber 214 to the return line 124 through the orifice and the relief valve in the first emergency-stop assembly 128. In this case, the kinetic energy of the piston 215 is converted to heat by the orifice and the relief valve in the first emergency-stop assembly 128. At the same time, if the pressure in the third chamber 218 drops down below the pressure in the line 126, hydraulic fluid will flow from the line 126, through the check valve in the second emergency-stop assembly 136 to the third chamber 218.

The first control valve 132 is connected to the high-pressure line 103, and to the line 126, on one side, and to the second chamber 214 and the third chamber 218 on the other side. The first control valve 132 has three positions. A center position blocks all connected lines. A left position connects the second chamber 214 to the high-pressure line 103, and the third chamber 218 to the line 126. A right position connects the second chamber 214 to the line 126, and the third chamber 218 to the high-pressure line 103. The lines from the first control valve 132 to the second chamber 214 and the third chamber 218 are through the orifices in the emergency-stop assemblies 128 and 136. The first control valve 132 is electrically controlled by the control unit 116, through a second cable 109. The first control valve 132 enables the control unit 116 to position the piston 215 in a controllable position relative to the cylinder 206.

The first chamber 208 enables hydraulic flow from the first port 216 and the high-pressure line 103, to the second port 207 and another high-pressure line 108, just while the piston 215 is within the allowable operating zone relative to the cylinder 206. The allowable operating zone is left to the position of the piston 215 relative to the cylinder 206, as shown by FIG. 2b, and right to the position of the piston 215 relative to the cylinder 206, as shown by FIG. 2c.

The second high-pressure line 108 is connected to the three control valves 106, 107, and 113, as well as to the check valves assembly 114. The fourth control valve 113 selects between run mode and stop mode. It is electrically controlled by the control unit 116, through the second cable 109. The fourth control valve 113 has two positions. The position as shown by FIG. 1 sets the Rebound-Effector to run mode. In this position, the fourth control valve 113 connects the third chamber 218, through the third port 210, to the third control valve 107, and the second chamber 214, through the fourth port 204, to the second control valve 106. When the fourth control valve 113 is at the second position, the one which is not shown by FIG. 1, then the Rebound-Effector is in stop mode. In this position, the fourth control valve 113 connects the third chamber 218, through the third port 210, to the right most two check valves in the check valves assembly 114, and the second chamber 214, through the fourth port 204, to the left most two check valves in check valves assembly 114. The check valves assembly 114 enables high pressure in the second chamber 214 or the third chamber 218 to flow to the first accumulator 123 through the second high-pressure line 108, the first chamber 208, and the first high-pressure line 103. The check valves assembly 114 enables flow from the line 126 to the second chamber 214 or the third chamber 218. The check valves assembly 114 prevents flow of high pressure to the line 126, or high pressure from the second high-pressure line 108 to the second chamber 214 and/or the third chamber 218.

The third control valve 107 is electrically controlled by the control unit 116, through the second cable 109. In the position shown by FIG. 1, the third control valve 107 connects the second high-pressure line 108, through a second line 111, the fourth control valve 113, and the third port 210, to the third chamber 218. At the other position, which is not shown by FIG. 1, the third control valve 107 connects the first line 126, through the second line 111, the fourth control valve 113, and the third port 210, to the third chamber 218.

The second control valve 106 is electrically controlled by the control unit 116, through the second cable 109. In the position shown by FIG. 1, the second control valve 106 connects the first line 126, through a third line 112, the fourth control valve 113, and the fourth port 204, to the second chamber 214. At the other position, which is not shown by FIG. 1, the second control valve 106 connects the second high-pressure line 108, through the third line 112, the fourth control valve 113, and the fourth port 204, to the second chamber 214.

A pressure sensor 115 measures the hydraulic pressure in the second high-pressure line 108, and delivers the information to the control unit 116, through a third cable 117. The pressure sensor 115 is not a must in the system. It is needed in case the hydraulic pump 102 has to be controlled by the control unit 116, and/or in case an oscillating time has to be controlled by the control unit 116.

The control unit 116 is connected to an operator consul by a fourth cable 118, to the pressure sensor 115 by the third cable 117, to the position sensor 220 by the first cable 134, and to the control valves 106, 107, 113, and 132, by the second cable 109.

The Rebound-Effector, which is described by FIG. 1, FIG. 2a, FIG. 2b, FIG. 2c, FIG. 2d, FIG. 2e, FIG. 2f and FIG. 2g, has the following basic features:
1. Non-harmonic, no "natural frequency" nor "resonance" movement of the back and forth oscillating weight, or any other component.
2. Asymmetric forces. The force to one direction is stronger than the force to the opposite direction.
3. Rectangular shape rebound forces.
4. Built-in driving-pressure line block, in case the piston is out of the operating zone.
5. Emergency stop.
6. Immediate, controlled stop.
7. Immediate start.

8. Active "left" resultant and active "right" resultant operation, controlled by a valve.
9. Controlled positioning of the piston relative to the cylinder.
10. Energy recovery and reuse.
11. Driven by virtually any open flow circuit, and pressure-controlled, hydraulic power pack.

Operating Description:

Reference is made to FIG. 1, FIG. 2a, FIG. 2b, FIG. 2c, FIG. 2d, FIG. 2e, FIG. 2f, FIG. 2g, FIG. 3a, FIG. 3b, FIG. 3c, FIG. 3d, FIG. 4a, FIG. 4b, FIG. 4c, FIG. 4d, FIG. 4e, FIG. 4f, and FIG. 4g.

For better understanding, it is assumed that:
The power pack 104 delivers high pressurized hydraulic fluid to the first high-pressure line 103, and receives the return hydraulic fluid from the return line 124.
The pump is pressure-compensated.
Accumulators 123 and 125 are fully charged.
A first face area 205 is bigger than a second face area 209.
The volume of accumulators 123 and 125 is much bigger than the maximum volume of the second chamber 214.
The pressure in the first line 126 is higher than the pressure in the return line 124, and much lower than the pressure in the first high-pressure line 103.
The pressure in the first high-pressure line 103, times second face area 209, is bigger than the pressure in the first line 126, times the first face area 205.

There are two modes of operating, or running, the Rebound-Effector. In the first mode, the control unit 116 changes the position of the second control valve 106 and the third control valve 107 in order to maintain the back and forth oscillating, periodic operation. In the second mode, the control unit 116 keeps the third control valve 107 in the position as shown by FIG. 1, while changing the position of the second control valve 106 in order to maintain the back and forth oscillating, periodic operation.

Figure 2D:
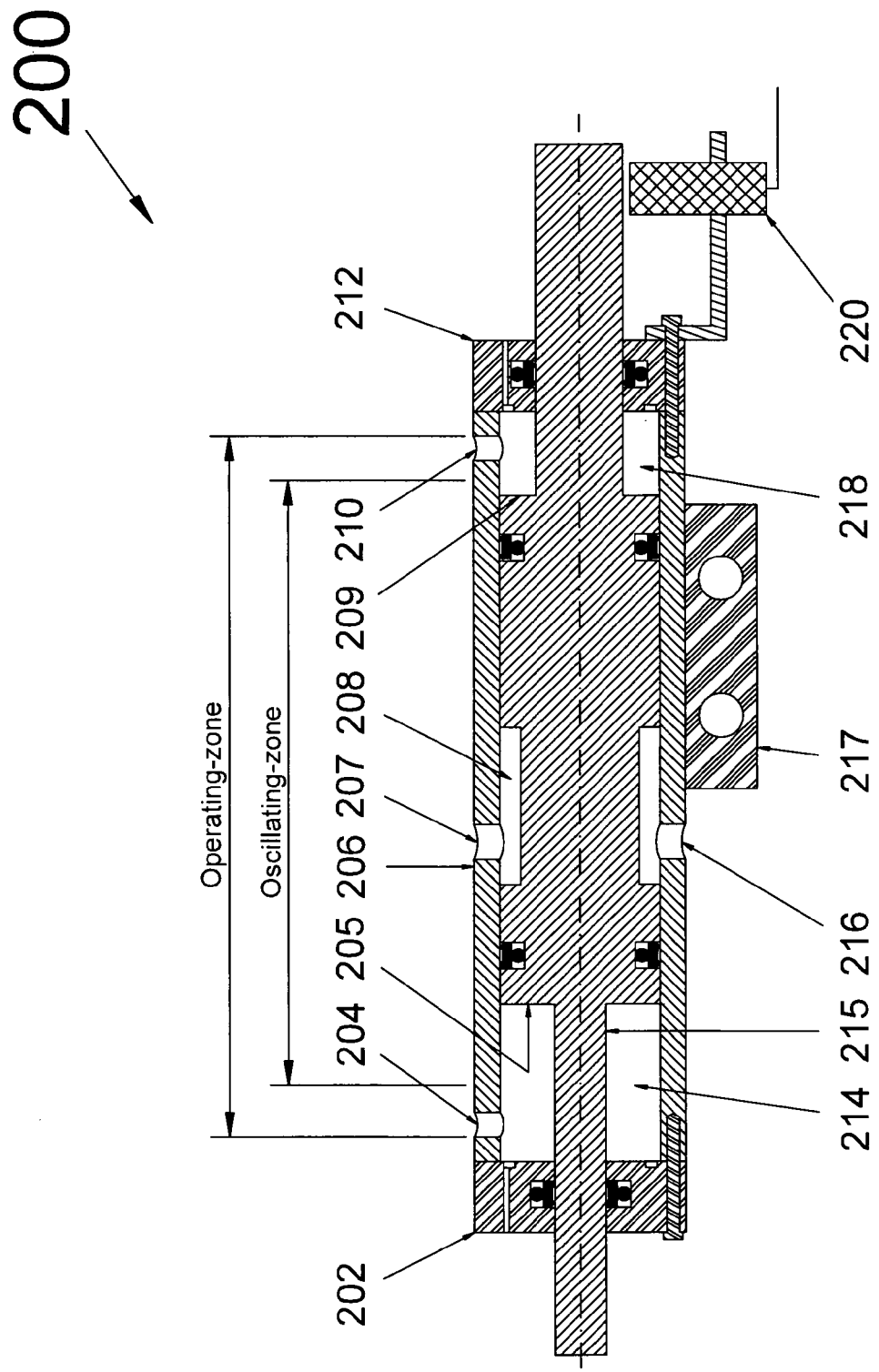

Operating Mode 1:

The control unit 116, or an operator through the control unit 116, drives the first control valve 132, through the second cable 109, as to position the piston 215 in a location which is shown by FIG. 2d, being assisted by the location information supplied by the position sensor 220, through the first cable 134, while setting the fourth control valve 113 to stop mode. The position of the piston 215, as shown by FIG. 2d, is next, and left, to the right most point of the oscillating zone. As the piston 215 reaches to the above position, the control unit 216 sets the fourth control valve 113 to run mode, as shown by FIG. 1, and, at the same time, sets the second control valve 106 and the third control valve 107 to the positions as being shown by FIG. 1. This is the start point of the oscillating period, which is a point that is indicated by reference numeral 301 in FIGS. 3a and 3b. High-pressured hydraulic fluid flows from the first high-pressure line 103, and the first accumulator 123 to the first port 216, the first chamber 208, the second port 207, the second high-pressure line 108, the third control valve 107, the second line 111, the fourth control valve 113, a fourth line 119 and the third port 210 to the third chamber 218, while the second chamber 214 displaces hydraulic fluid to the first line 126 and the second accumulator 125, through the fourth port 204, a fifth line 110, the fourth control valve 113, the third line 112, and the second control valve 106. The high pressure in the third chamber 218 accelerates the piston 215 to the left. The flow from the second chamber 214 fills the second accumulator 125 and raises the pressure in the first line 126. If the pressure in the first line 126 reaches the setting of the second relief valve 127, then the second relief valve 127 drains hydraulic fluid to the return line 124 as to keep the pressure in the first line 126 below the setting point of the second relief valve 127. When the piston 215 comes to the position shown by FIG. 2e, the position sensor 220 sends a signal to the control unit 116 through the first cable 134. The control unit 116 changes the positions of the second control valve 106 and the third control valve 107 to the position which is not shown by FIG. 1. At that moment, the third chamber 218 is connected to the first line 126 and the second accumulator 125 through the third control valve 107, the second line 111, the fourth control valve 113, the fourth line 119, and the third port 210, while the second chamber 214 is connected to the pressure of the first high-pressure line 103 and the first accumulator 123 through the first port 216, the first chamber 208, the second port 207, the second control valve 106, the third line 112, the fourth control valve 113, the fifth line 110, and the fourth port 204. This is a point that is indicated by reference numeral 302 in FIG. 3a and FIG. 3b. Hydraulic fluid flows from the first line 126 and the second accumulator 125 into the third chamber 218, and from the second chamber 214 into the first high-pressure line 103 and the first accumulator 123. The high pressure in the second chamber 214 accelerates the piston 215 to the right, while the last is moving to the left, until, eventually, it will stop moving at the position shown by FIG. 2f, or to the right of this position. This is a point that is indicated by reference numeral 303 in FIG. 3a and FIG. 3b. From here, the above high pressure will keep accelerating the piston 215 to the right, while the last is moving to the right, until being in the position shown by FIG. 2e. In this movement to the right, while accelerating to the right, hydraulic fluid flows from the first high-pressure line 103 and the first accumulator 123 to the second chamber 214, and from the third chamber 218 to the first line 126 and the second accumulator 125. Reaching the position shown by FIG. 2e, the position sensor 220 sends a signal to the control unit 116, through the first cable 134. The control unit 116 changes the positions of the second control valve 106 and the third control valve 107 to the positions as being shown by FIG. 1. This is a point that is indicated by reference numeral 304 in FIG. 3a and FIG. 3b. High-pressured hydraulic fluid flows from the third chamber 218 to the first high-pressure line 103 and the first accumulator 123 through the third port 210, the fourth line 119, the fourth control valve 113, the second line 111, the third control valve 107, the second high-pressure line 108, the second port 207, the first chamber 208, and the first port 216. At the same time, hydraulic fluid flows from the first line 126 and the second accumulator 125 to the second chamber 214 through the second control valve 106, the third line 112, the fourth control valve 113, the fifth line 110, and the fourth port 204. The high pressure in the third chamber 218 accelerates the piston 215 to the left, while the last moves to the right, until, eventually, it will stop moving at the position shown by FIG. 2d. This is a point that is indicated by reference numeral 305 in FIGS. 3a and 3b. The piston 215 is back in the start point of the oscillating period. From here the next period starts, but the control unit 116 does not have to set the various control valves 113, 107, and 106—as they are at the right position. The new period starts from this point, and so on.

Figure 3B:
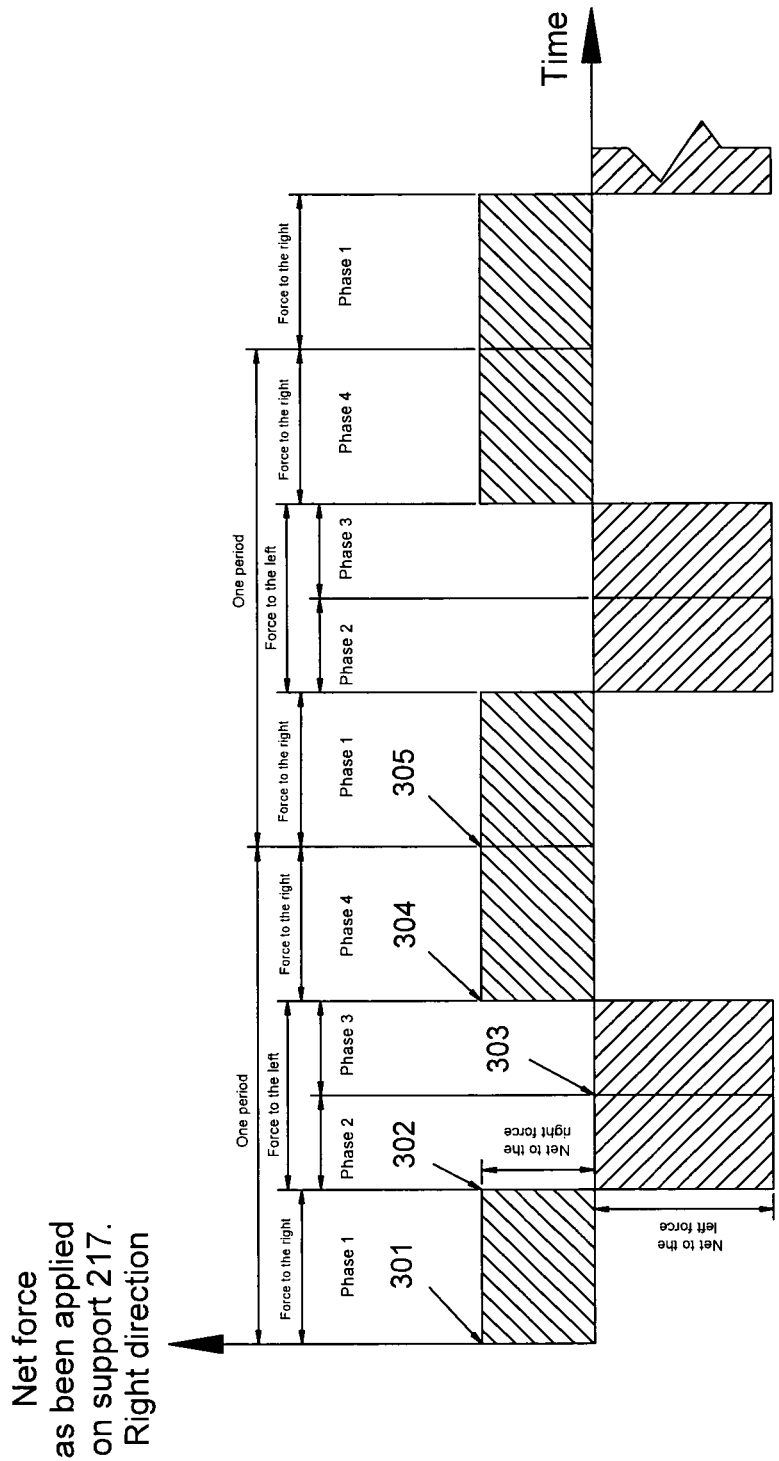

In the above-described process, hydraulic energy is converted to kinetic energy, and vise versa. The power pack 104 has to compensate for the losses in the system, and for the outside delivered energy. As the accumulators 123 and 125 are big enough, they keep the internal pressure practically constant. It means that the pressure in the first high-pressure line 103, as well as the pressure in the first line 126, is constant during the above-described oscillating period. The force which accelerates the piston 215 to the left is the product of the second face area 209 times the pressure in the second high-pressure line 108 minus the friction, and minus the product of the first face area 205 times the pressure in the first line 126. As all the above parameters are constant, the force is constant as well. The force which accelerates the piston 215 to the right is the product of the first face area 205 times the pressure in the second high-pressure line 108, minus the friction, and minus the product of the pressure in the first line 126 times the second face area 209. As all the above parameters are constant, the force is constant as well. FIG. 3a shows the forces, as effecting the support 217, in time base. FIG. 3b shows the net force, as applied on the support 217, in time base. FIG. 3b shows that the time-based force graph has a rectangular, non-symmetric shape. The force to one side is not the same as the force to the opposite side. The above-described Rebound-Effector starts, immediately, at the designed period, and forces. This Rebound-Effector cannot freely run. It needs the use of valves in order to regularly oppose the second high-pressure line 108, and the first line 126 in between the second chamber 214 and the third chamber 218, and vice versa. FIG. 3b shows, among other things, the direction of movement, and acceleration, of the piston 215, in each phase of the operating period. The above-described Rebound-Effector, in the described operating mode, creates net rebound force to the left which is smaller than the rebound force to the right, as been applied on the support 217.

Figure 2E:
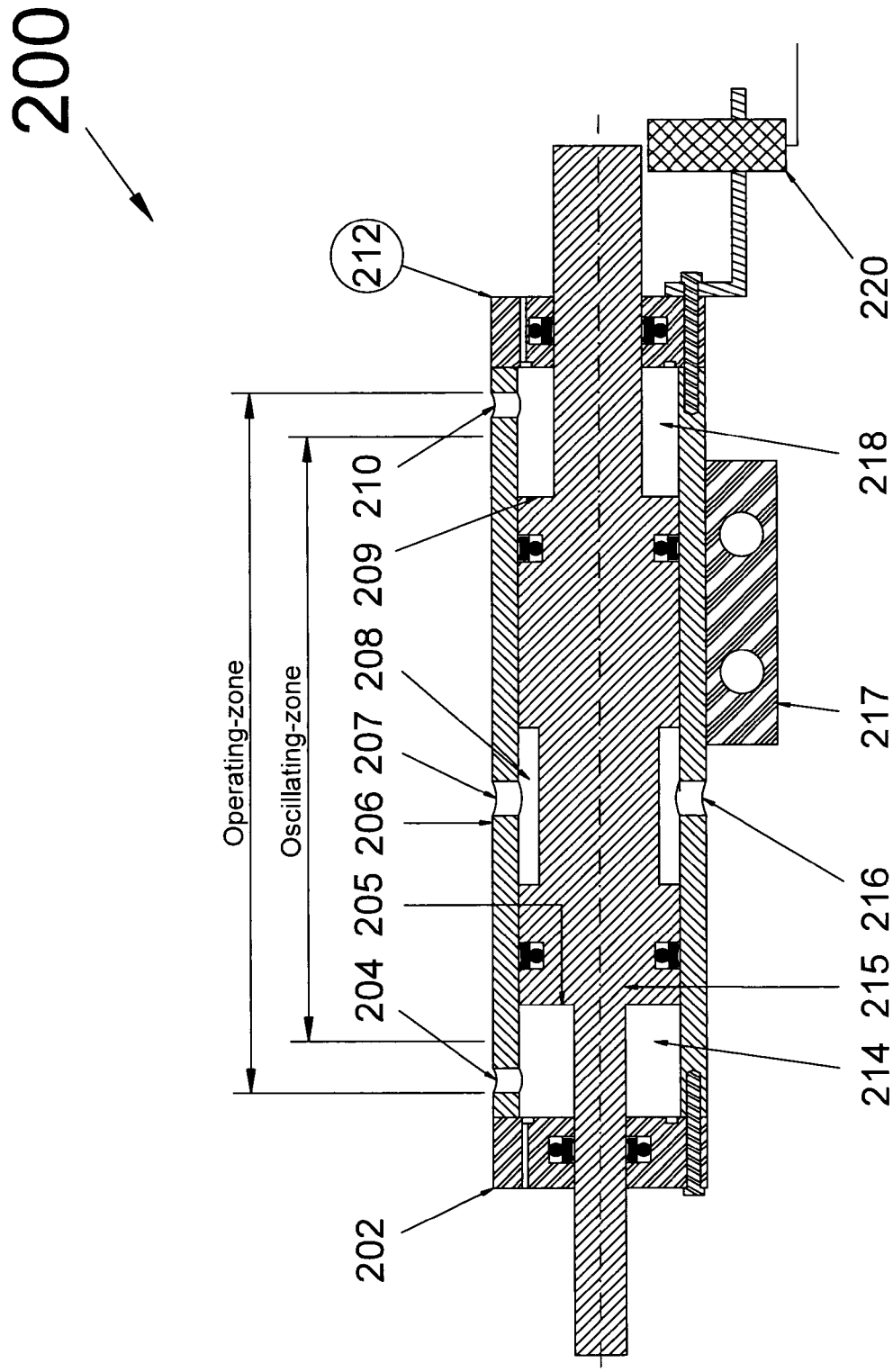
Figure 2G:
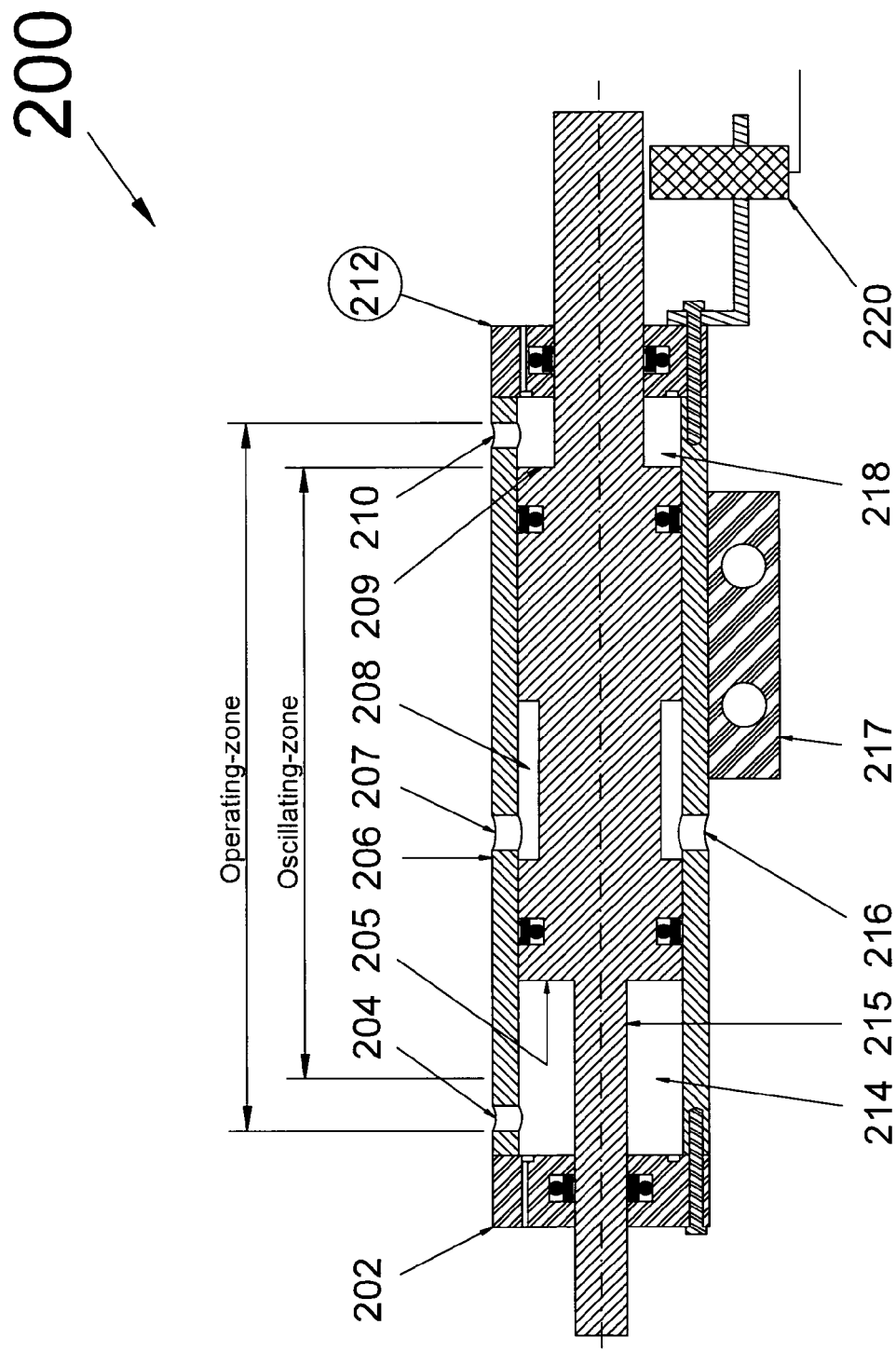

There are three ways to stop the above-described Rebound-Effector. The first one is by stopping the hydraulic pressure supply from the power pack 104, while maintaining the control valves 113, 106, and 107 in operation as described above. Depending on the external load, and internal losses, the Rebound-Effector will reduce its oscillating zone length until it, eventually, will stop. The way to stop hydraulic pressure supply from the power pack 104 is not shown by FIG. 1. The second way is to switch the fourth control valve 113 to stop mode—to the position which is not shown by FIG. 1. In stop mode, each of second chamber 214 and the third chamber 218 is connected to a pair of check valves in the check valves assembly 114. Each pair of check valves enables flow from the second chamber 214 and the third chamber 218 to the second high-pressure line 108, and all the way to the first high-pressure line 103 and the first accumulator 123—but not the other direction. Each pair of check valves enables flow to the second chamber 214 and the third chamber 218 from the first line 126 and the second accumulator 125—but not the other direction. If, as an example, the piston 215 moves to the right, while the fourth control valve 113 is switched to stop mode, then a pressure will build up in the third chamber 218, which, eventually, will be more than the pressure in the first high-pressure line 103 and the first accumulator 123, and the hydraulic fluid in the third chamber 218 will flow through the third port 210, the fourth line 119, the fourth control valve 113, and check valves assembly 114, to the second high-pressure line 108, and all the way to the first high-pressure line 103 and the first accumulator 123. The pressure in the second chamber 214 will decrease, and eventually will be less than the pressure in the first line 126, and the second accumulator 125, and hydraulic fluid will flow from the first line 126, and the second accumulator 125, to the second chamber 214. The stop mode of the fourth control valve 113 introduces the chamber being smaller in volume, due to the movement of the piston 215, to high pressure, and the chamber being higher in volume, due the movement of the piston 215, to low pressure. Thus, the kinetic energy of the piston 215 is converted to compressed gas energy in the first accumulator 123, while preventing vacuum as well. The above-described second way to stop the Rebound-Effector realizes that the Rebound-Effector stops immediately, during the current phase, and before leaving the operating zone as shown by FIG. 2e. The third way to stop the above-described Rebound-Effector is by an emergency stop. If the piston 215 is out of the operating zone, as shown by FIG. 2b, and FIG. 2c, to the right, or to the left, the piston 215 blocks the first port 216 and the second port 207, so that the second high-pressure line 108 is disconnected from the first high-pressure line 103 and the first accumulator 123. There is no driving source for any direction for the piston 215. At the same time, the piston 215 blocks the fourth port 204 or the third port 210. The first emergency-stop assembly 128 is connected to the second chamber 214, and the second emergency-stop assembly 136 is connected to the third chamber 218. Each emergency-stop assembly includes an orifice, a relief valve, and a check valve. Each of the relief valves is set to a pressure higher than the first high-pressure line 103 and the first accumulator 123—so that in a normal operation of the Rebound-Effector they are both in off position, blocking flow from the second chamber 214 and/or the third chamber 218 to the return line 124. If, as an example, the piston 215 exceeds the operating zone, as shown by FIG. 2c, to the left, while moving to the left, then the piston 215 blocks the first port 216 and the second port 207 disconnecting the second high-pressure line 108 from the first high-pressure line 103 and the first accumulator 123, and, at the same time, blocking the fourth port 204. High pressure is built up in the second chamber 214, which, eventually, being higher than the setting of the relief valve in the first emergency-stop assembly 128, and a hydraulic fluid flow from the second chamber 214, through the orifice, and the relief valve in the first emergency-stop assembly 128, starts. This flow is limited by the orifice, thus the pressure in the second chamber 214 may be higher than the setting pressure of the relevant relief valve. On the other side of the piston 215, a low pressure is developed in the third chamber 218. When the pressure in the third chamber 218 becomes less than the pressure in the first line 126 and the second accumulator 125, hydraulic fluid will flow from the first line 126 and the second accumulator 125, through the check valve of the second emergency-stop assembly 136, to the third chamber 218. If the fourth control valve 113 will be in run mode, and the second control valve 107 will be in the position other than shown by FIG. 1, then there will be flow from the first line 126, and the second accumulator 125, through the third control valve 107, and the fourth control valve 113 to the third chamber 218 as well.

In each period, the second chamber 214 is disconnected from the driving source, the second high-pressure line 108, for two phases—phase 1, and phase 4, as shown by FIG. 3a and FIG. 3b. In each period, the third chamber 218 is disconnected from the driving source, the second high-pressure line 108, for two phases—phase 2, and phase 3, as shown by FIG. 3a and FIG. 3b.

Operating Mode 2:

There is one more mode to run the above-described Rebound-Effector—by keeping the third control valve 107 all the time in the position as shown by FIG. 1. In this mode, the second high-pressure line 108 is constantly connected to the third chamber 218, while the second chamber 214 is connected to the second high-pressure line 108 or to the first line 126 and the second accumulator 125. If a process of running the Rebound-Effector is started, while the piston 215 locates in the position as shown by FIG. 2d, the control valves 132, 113, 107 and 106 are in the position as shown by FIG. 1, then the second chamber 214 is connected to the first line 126, and the second accumulator 125, while the third chamber 218 is connected to the first high-pressure line 103, and the first accumulator 123. The high pressure in the third chamber 218 will accelerate the piston 215 to the left, while moving to the left. This is point 301 shown by FIG. 3*c* and FIG. 3*d*. the piston 215 will keep accelerating, and moving, to the left until it will come to the position as shown by FIG. 2*e*. In this position, the position sensor 220 sends a signal to the control unit 116. The control unit 116 changes the position of the second control valve 106 to the position which is not shown by FIG. 1. The third chamber 218 remains connected to the second high-pressure line 108, while the second chamber 214 is now connected to the second high-pressure line 108 as well. Both chambers 214 and 218 are connected to the same high pressure source. As the first face area 205 is bigger than the second face area 209, a net force to the right accelerates the piston 215 to the right, while the last moves to the left. This is point 302 shown by FIG. 3*c* and FIG. 3*d*. The piston 215 looses velocity, until it eventually will stop moving. This point is as shown by FIG. 2*f*, or a while to the right. This is point 303 shown by FIG. 3*c* and FIG. 3*d*. None of the control valves changes its position—so the piston 215 keeps being accelerated to the right, while moving to the right. The movement of the piston 215 to the right will continue until the last will be in the position as shown by FIG. 2*e*. In this position, the position sensor 220 sends a signal to the control unit 116. The control unit 116 changes the position of the second control valve 106 to the position as shown by FIG. 1. The second chamber 214 is connected to the first line 126 and the second accumulator 125, while the third chamber 218 is connected to the second high-pressure line 108. The high pressure in the third chamber 218 accelerates the piston 215 to the left while the last moves to the right. This is point 304 shown by FIG. 3*c* and FIG. 3*d*. The piston 215 will keep moving to the right, while accelerating to the left, until, eventually, it will stop moving. This is point 305 shown by FIG. 3*c* and FIG. 3*d*. The position of the piston 215 is shown by FIG. 2*d*. From here, the above-described period starts again, and so on.

Figure 3C:
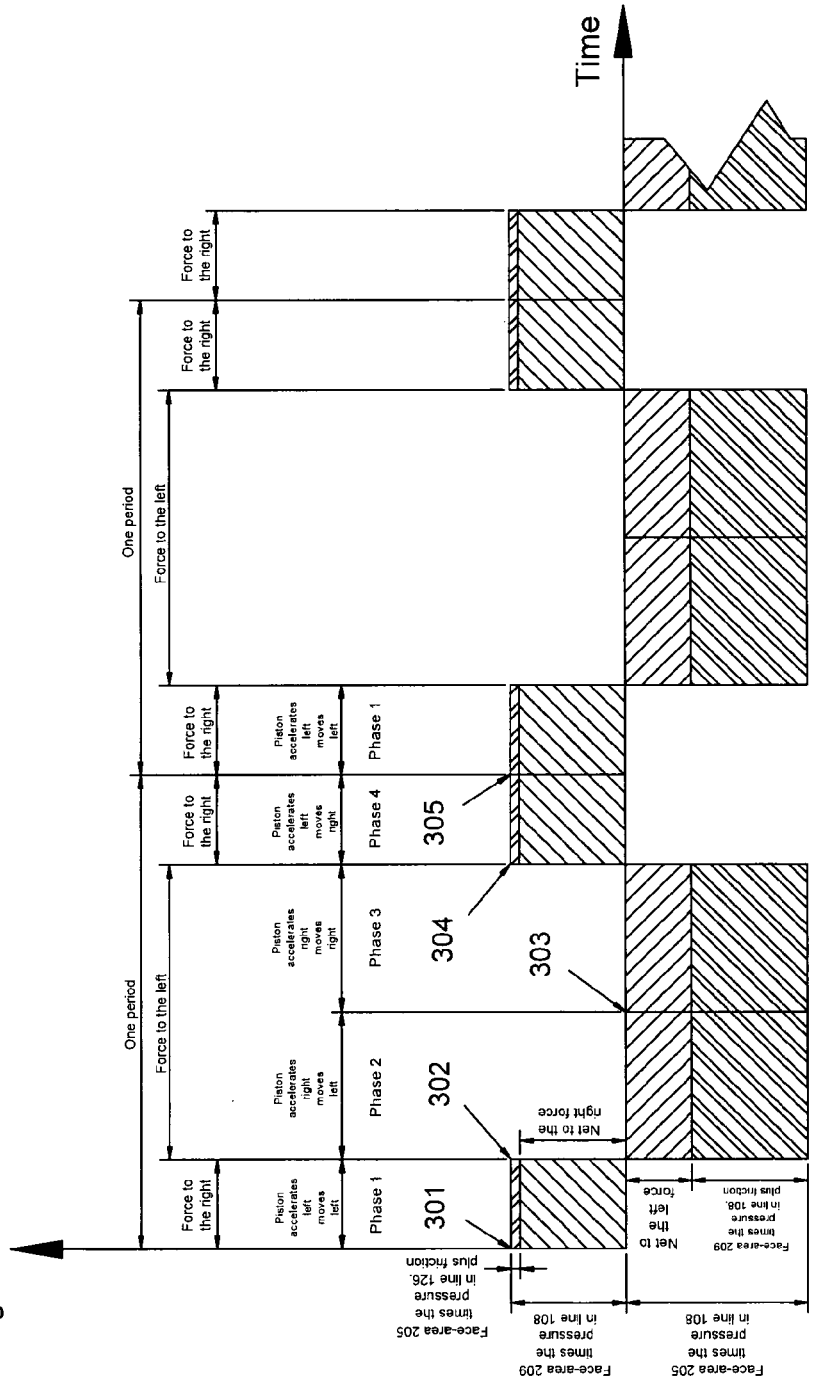
Figure 3D:
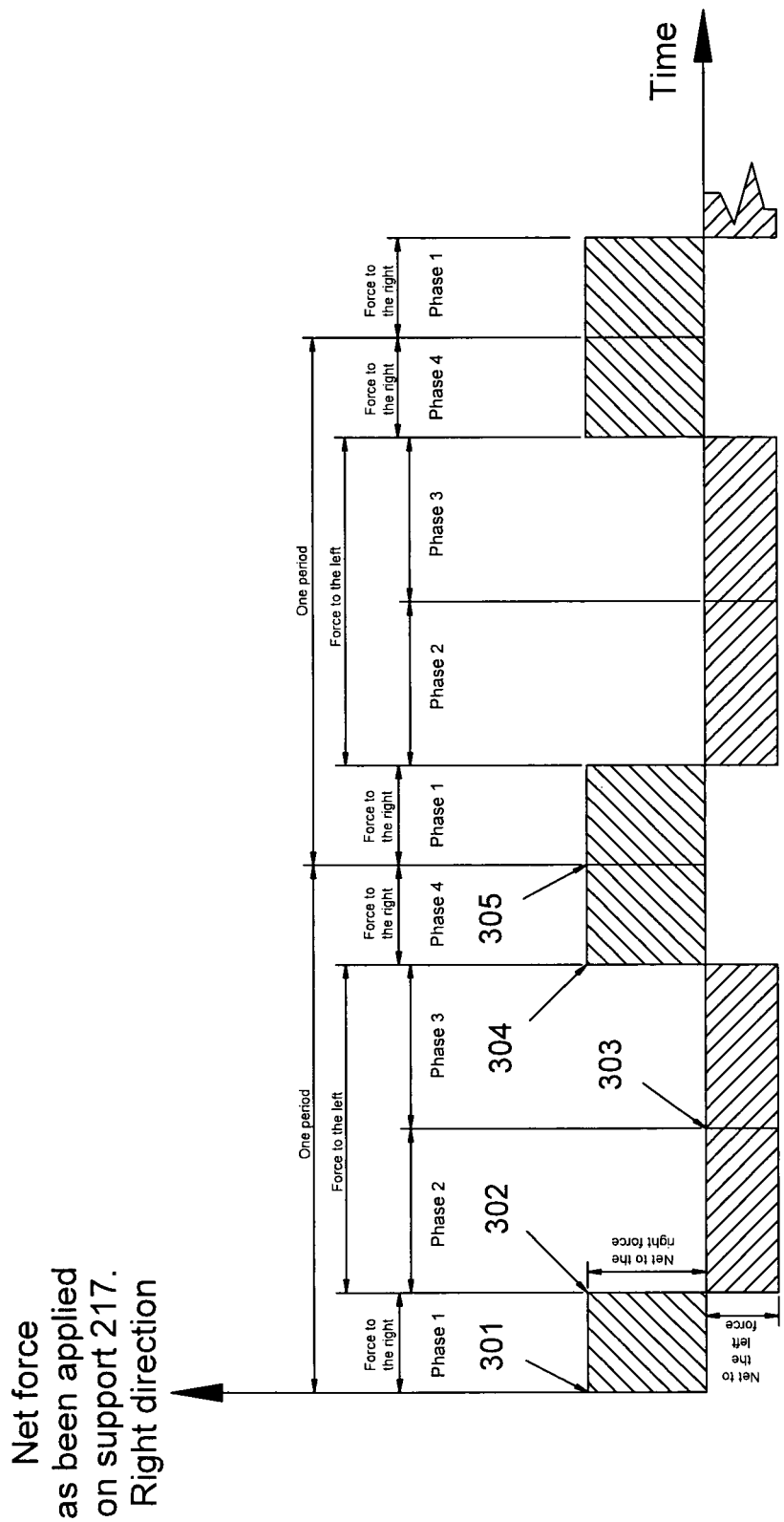

FIG. 3*c* shows, among other things, the forces the Rebound-Effector creates in this mode, as been applied on the support 217, as a function of time. FIG. 3*d* shows the net forces as been applied on the support 217, as a function of time. If the first face area 205 is smaller than two times the second face area 209, then, in this mode of operation, the rebound force to the right is bigger than the rebound force to the left, as been applied on the support 217, and shown by FIG. 3*d*. The functionality of the first control valve 132 and the fourth control valve 113, emergency-stop assemblies 128 and 136, and check valves assembly 114, are all the same as in operating mode 1. In each period, the second chamber 214 is disconnected from the driving source, the second high-pressure line 108, for two phases—phase 1, and phase 4, as shown by FIG. 3*c* and FIG. 3*d*. In each period, the third chamber 218 is connected to the driving source, the second high-pressure line 108, for four phases—phase 1, phase 2, phase 3, and phase 4, as shown by FIG. 3*c* and FIG. 3*d*.

In operating mode 1, the force to the left, as been applied on the support 217, is bigger than the force to the right. In operating mode 2, the force to the right, as been applied on the support 217, is bigger than the force to the left. The above difference in between the modes of operating allows for selecting the side where the force will be bigger, and thus to have bias-alike to that side. In both operating modes, the force to the right, as been applied on the support 217, is the same, while the force to the left, in operating mode 1 is bigger than in operating mode 2.

In both modes of operation, the Rebound-Effector creates rectangular-shaped forces to the left, and to the right, with sharp and fast changes from side to side—as shown by FIG. 3*b* and FIG. 3*d*. It is called rectangular wave—which reminds the term sinus wave. The rectangular wave is important, as it behaves differently from the sinus wave. Actually, the rectangular wave is not a true wave—as it has two non-continues points each period, and the rest are striate lines. The number of periods of the Rebound-Effector, per time unit, has a different meaning and influence, than the common "frequency" term for the sinus, harmonic, wave. In general, the rectangular wave has better driving capacity, and lower penetration, than the sinus wave. In the Rebound-Effector, the piston 215 moves to the left, and to the right, by switched forces, which have nothing to do with "natural frequency", or "resonance". In the operating modes as described, the piston 215 has no capacity to oscillate inside the cylinder 206, without the functionality of at least the second control valve 106.

The pressure sensor 115 measures the pressure in the second high-pressure line 108, and delivers the result to the control unit 116 through the third cable 117. One use of the pressure sensor 115 is to prevent running of the Rebound-Effector in case the pressure in the second high-pressure line 108 is too high, or too low. If the control of the pump 102 is connected to, and controlled by, the control unit 116, the reading of the pressure sensor 115 serves as feedback for the control unit 116. Other use of the pressure sensor 115 is to regulate the created forces, and the period time.

The period time of the above-described Rebound-Effector can be changed by changing the pressure in the second high-pressure line 108, and by changing the oscillating zone length. Increasing the pressure in the second high-pressure line 108, and/or reducing the oscillating zone length, reduces the period time of the Rebound-Effector. Reducing the pressure in the second high-pressure line 108, and/or increasing the oscillating zone length, increases the period of the Rebound-Effector.

Figure 4A:
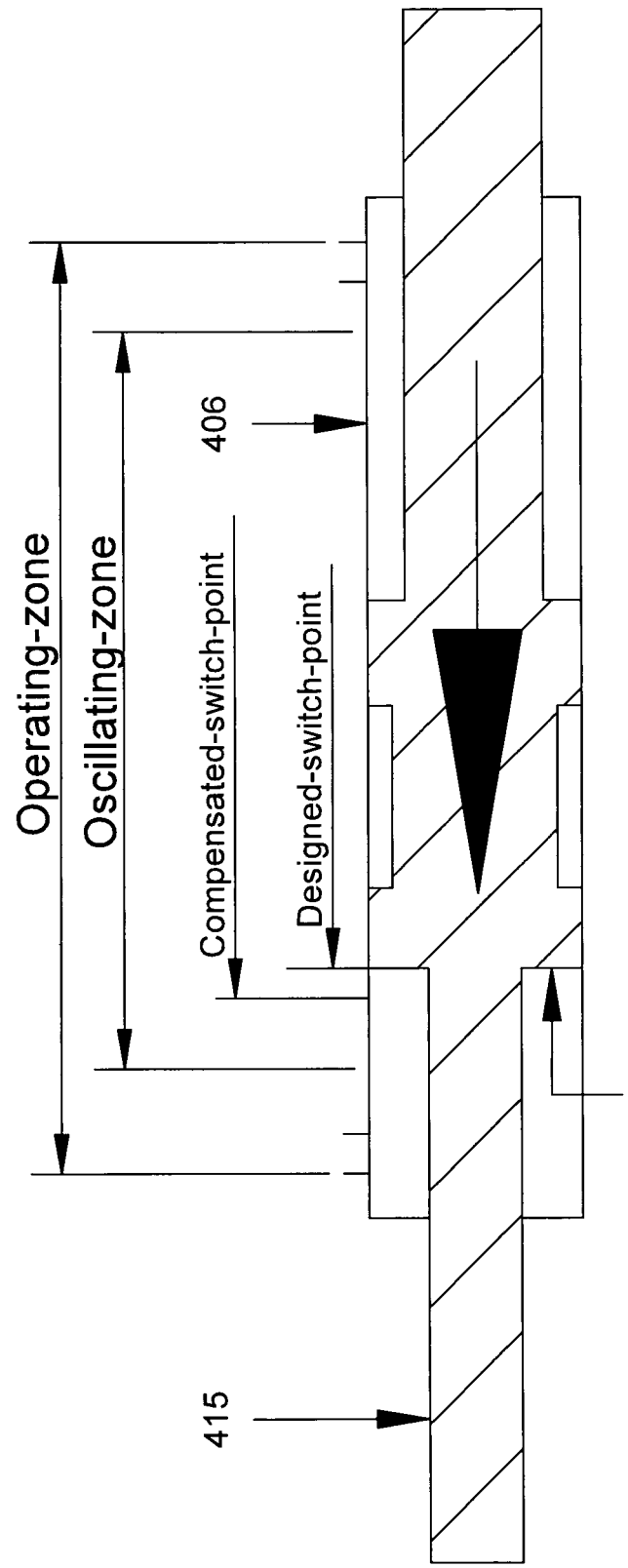
FIG. 4a and FIG. 4b schematically show the piston, the cylinder, and the different control switch points.
Figure 4B:
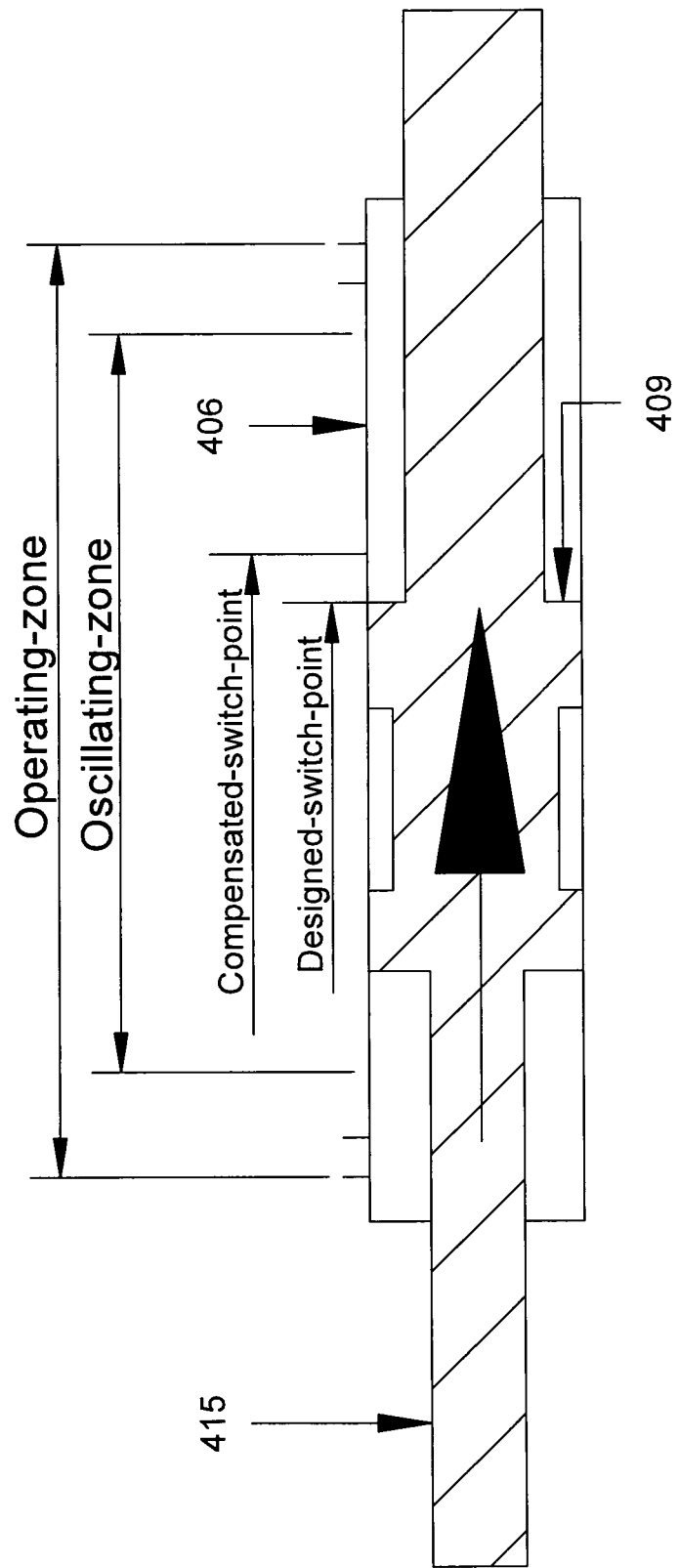

Control:

The above-described Rebound-Effector cannot function without a control system. The control system has two main tasks. The first task is to detect the location of the piston 215 relative to the cylinder 206, and to switch the driving force direction from side to side, at the right position. The second task is to take care of the compensation for the loss of energy, and the transmittal of energy. One option to realize the control system is by the electric position sensor 220, the control unit 116, and the second control valve 106, or the second and the third control valves 106 and 107—as shown by FIG. 1. The position sensor 220 may be realized by few ways. Below there are detailed descriptions of three options for realizing the position sensor 220. Rectangular wave output force, as described above, and as shown by FIG. 3*a*, FIG. 3*b*, FIG. 3*c*, and FIG. 3*d*, is the preferred output force. Even though virtually any shape of output force can be realized by the Rebound-Effector, the rectangular wave seems to be the most efficient and practical one. The below descriptions, calculations, and figures of the options for the control systems refer to a Rebound-Effector creating rectangular wave output forces. The rectangular wave output of the Rebound-Effector may have the same force toward both, opposite, directions, or a certain force to one direction, and a different force to the opposite direction. A designed switch point, as shown by FIG. 4*a*, and FIG. 4*b*, is the point where the control unit 116 has to change the position of the second control valve 106, or the second and the third control valves 106 and 107, while the piston 415 crosses. The designed switch point is set as the force to the left, times the traveling distance of the piston 415 from the left most of the oscillating zone to the designed switch point is the same as the force to the right, times the traveling distance of the piston 415 from the right most of the oscillating zone to the designed switch point. If there is no need to add energy into the system, in an ideal situation, the real switch point will be the designed switch point. In the real world, there is loss of energy, which has to be reinserted into the Rebound-Effector energy stock. The energy insertion is done by switching the second control valve 106, or the second and the third control valves 106 and 107, a while after crossing the designed switch point. The longer the time delay from crossing the designed switch point to the real switch point, the more energy comes into the Rebound-Effector energy stock. The real switching position is marked as compensated switch point shown by FIG. 4*a*, and FIG. 4*b*. FIG. 4*a* shows the piston 415 moves to the left relative to the cylinder 406. If no energy has to be added into the Rebound-Effector, the control switch point is the crossing of the first face area 405 of the designed switch point. If energy has to be added into the Rebound-Effector, the control switch point is a while more to the left, the crossing of the first face area 405 of the compensated switch point. FIG. 4*b* shows the piston 415 moves to the right relative to the cylinder 406. If no energy has to be added into the Rebound-Effector, the control switch point is the crossing of the second face area 409 the designed switch point. If energy has to be added into the Rebound-Effector, the control switch point is a while more to the right, the crossing of the second face area 409 of the compensated switch point. In general, as the pressure in the second high-pressure line 108 is higher, the period time is shorter, and the forces are higher. As the real oscillating zone is longer, the period time is longer, the energy in the Rebound-Effector is higher, but the induced forces, on the support 217, are the same.

Energy may be added by increasing the driving power during phase 1 and/or during phase 3. Increasing the driving source power increases the acceleration of the weight, and its kinetic energy. One more option to add energy into Rebound-Effector is by decreasing the driving power during phase 2 and/or phase 4. Reducing the driving source power during phase 2 and/or phase 4 increases the displacement during the relevant phase, so the acceleration distance during the next phase will be longer, and the weight will gain more kinetic energy.

Option 1:

The position sensor 220 is realized by a sensor which measures the position of the piston 215 along the complete operating zone, as described above, and is shown by FIG. 2*d*. In such a case, the control unit 116 regularly receives information regarding the position of the piston 215 relative to the cylinder 206. Having the position of the piston 215, the control unit 116 can calculate the velocity. The control unit 116 may have the pressure in the second high-pressure line 108 through the pressure sensor 115, or by calculating the dynamic behavior of the piston 215, or by taking into account the operating pressure in the second high-pressure line 108 as a parameter. Having the above information, and the commands from the operator through the fourth cable 118, the control unit 116 calculates the position of the piston 215, in which it has to switch the position of the second control valve 106, or the second and the third control valves 106 and 107, from the existing position to the opposite position. The control unit 116 dynamically calculates the switch point by calculating, or measuring, the most extreme, last position, and the needed most extreme position to the other side, the ratio between the two forces, and the direction of movement of the piston 215. Those are all simple, kinematic calculations.

Figure 4C:
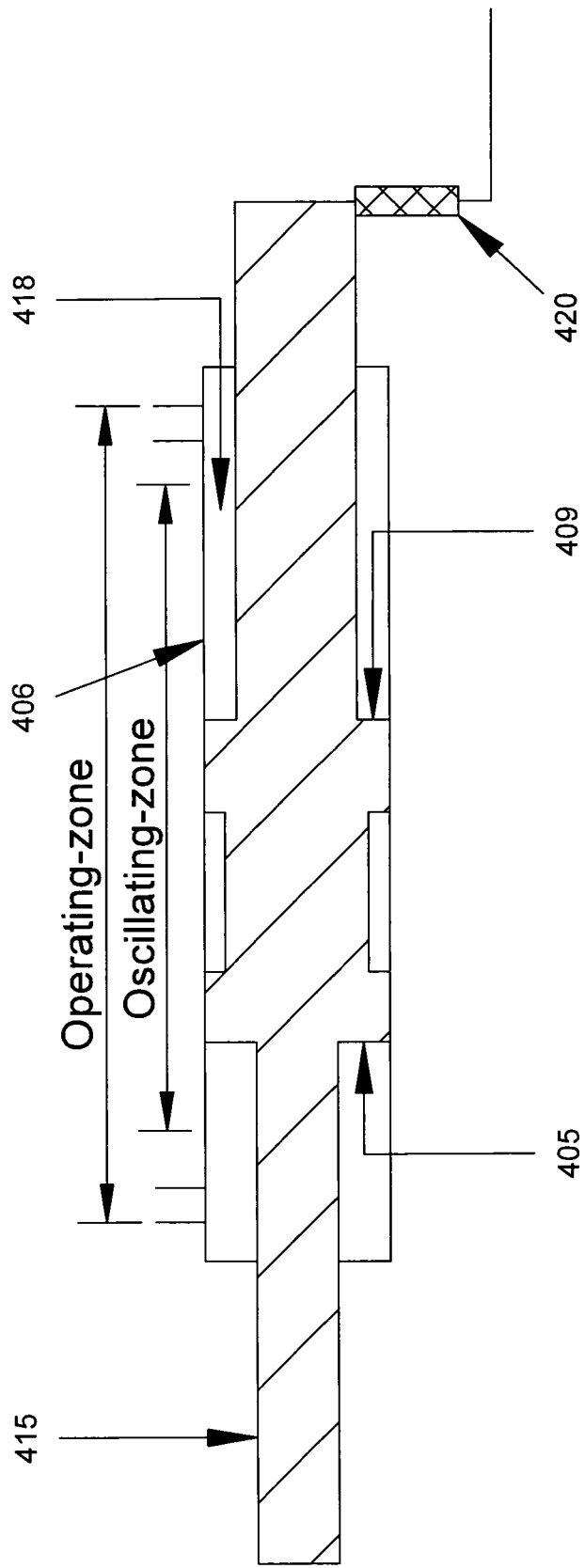
FIG. 4c schematically shows the positions of the piston, and the position sensor which is realized by one proximity switch.

Option 2:

Another option to realize the position sensor 220 is by one proximity sensor, or metal detector, or through beam sensor, which detects the crossing of the piston 215, as well as whether the last is left, or right, to the crossing point. The preferred position of the position sensor 220 is at the designed switch point, as shown by FIG. 4*c*. As the piston 215 crosses the designed switch point, the position sensor 220 changes its output. The control unit 116 measures the time taken from one crossing of the piston 215 to the next crossing. The control unit 116 has a look-up table which states for a certain force, frequency, and measured time—what has to be the delay in switching signal. The control unit 116 waits the needed delay time, and then switches the second control valve 106 or the second and the third control valves 106 and 107.

Option 3:

The position sensor 220 shown by FIG. 2*a* is realized by three proximity sensors—420*a*, 420*b*, and 420*c*—as shown by FIG. 4*d*. The position sensor 420*b* is located at the designed switch point, and senses the piston 415 crossing this point, including direction of crossing. A third position sensor 420*c* is located at the point that if the piston 415 is not crossing, energy has to be added to the Rebound-Effector. A first position sensor 420*a* is located at the point that if the piston 415 did not cross the first position sensor 420*c*, then the switch will occur there, while the piston 415 moves to the left. As long as there is enough energy in the Rebound-Effector, and the piston 415 crosses the third position sensor 420*c*, as shown by FIG. 4*e*, the switch point is while the piston 415 crosses a second position sensor 420*b*, as shown by FIG. 4*d*. Once the piston 415 crosses the second position sensor 420*b* to the right, but does not cross the third position sensor 420*c* before crossing again the second position sensor 420*b*, as shown by FIG. 4*f*, then the switch point for the left moving of the piston 415 will be crossing the first position sensor 420*a*, as shown by FIG. 4*g*. When the piston 415 moves to the right, the switch point is the rightward crossing of the second position sensor 420*b*—as shown by FIG. 4*d*.

Figure 19E:
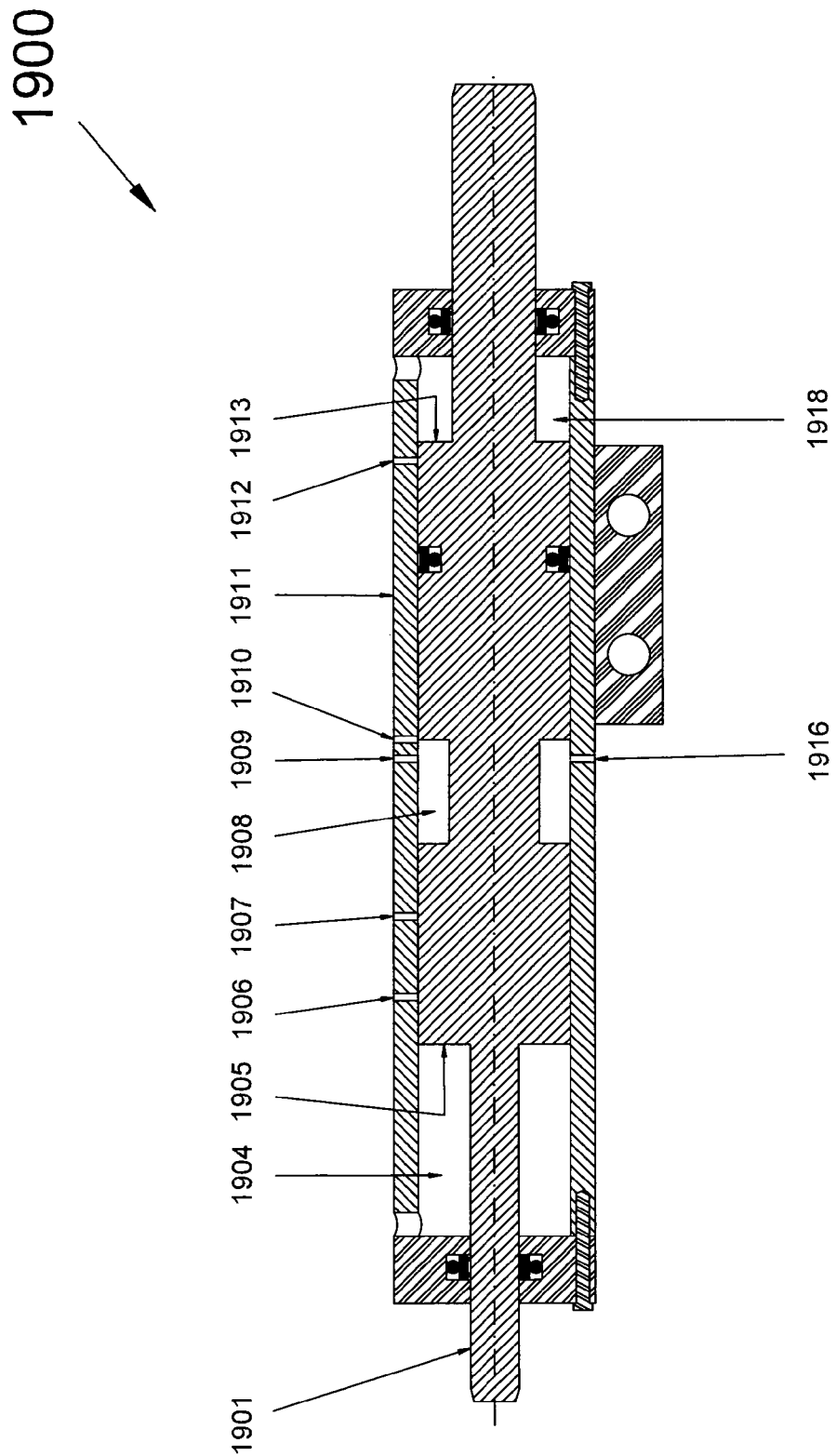
Figure 20:
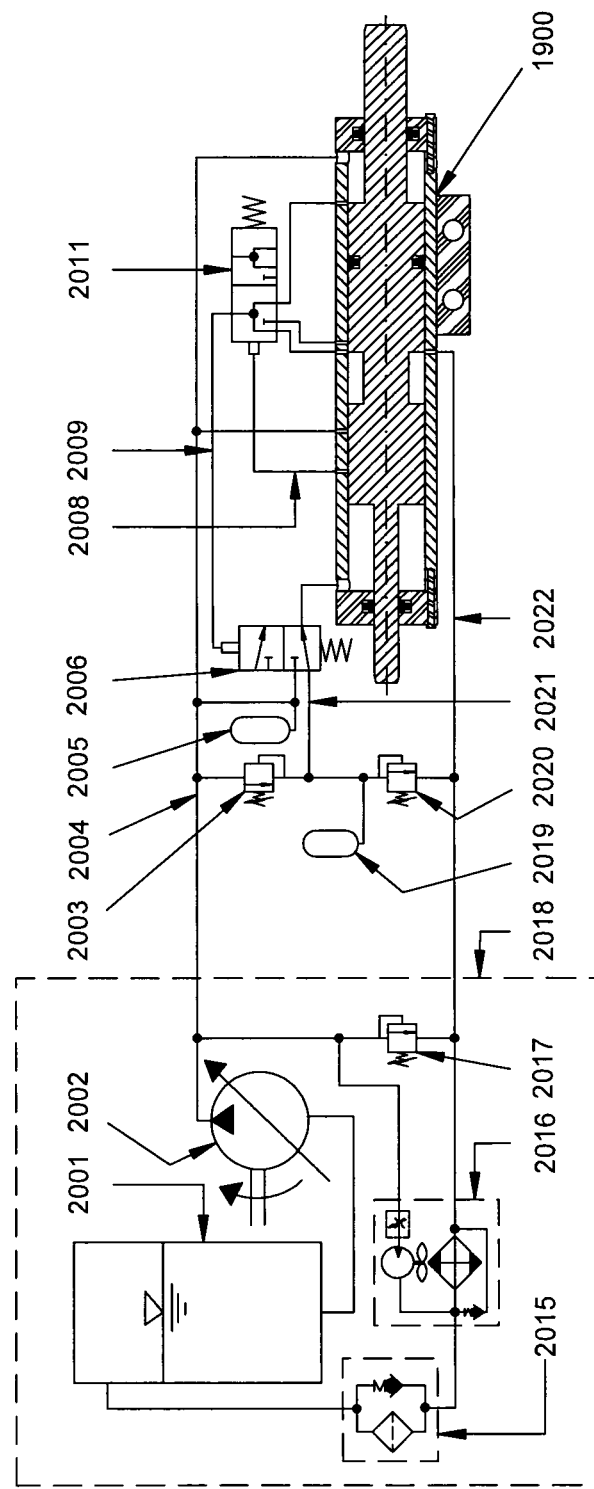
FIG. 20 is a schematic of hydraulic-driven, and hydraulic-controlled Rebound-Effector system.

Hydraulic Driving and Controlling:

The Rebound-Effector may be fully hydraulic—all its functions are hydraulically realized, as shown by FIG. 19*a*, FIG. 19*b*, FIG. 19*c*, FIG. 19*d*, FIG. 19*e*, and by FIG. 20. FIG. 20 shows a schematic of the complete system. For simplicity, the below description ignores the start-up positioning, controlled breaking, and emergency breaking, sub-systems. Part 1900 shown by FIG. 20 is the piston-cylinder assembly. This assembly is shown in detail, and different positions of the piston relative to the cylinder, by FIG. 19*a*, FIG. 19*b*, FIG. 19*c*, FIG. 19*d*, and FIG. 19*e*. A power pack 2018 is a common hydraulic power supply. It includes a hydraulic fluid tank 2001, a pressure compensated pump 2002, a first relief valve 2017, a cooling assembly 2016, and a filtering assembly 2015. The power pack 2018 supplies high pressure hydraulic fluid by a high-pressure line 2004, and receives the return, low pressure, hydraulic fluid by a return line 2022. A regulator 2003 keeps the pressure in a line 2021 at a higher level than the pressure in the return line 2022, but at a lower level than the pressure in the high-pressure line 2004. The second relief valve 2020 maintains the maximum pressure in the line 2021. A first accumulator 2019 keeps the pressure in the line 2021, while a second accumulator 2005 keeps the pressure in the high-pressure line 2004. A first chamber 1918 is constantly connected to the high-pressure line 2004. A second chamber 1904 is connected to a first control valve 2006. The first control valve 2006 connects the second chamber 1904 to the line 2021 and the first accumulator 2019, or to the high-pressure line 2004 and the second accumulator 2005. The first control valve 2006 is controlled by pressure on one side, and spring on the other side. The control pressure to the first control valve 2006 comes from a second control valve 2011. The second control valve 2011 is pressure-controlled on one side, and spring-loaded on the other. The pressure for the control line of the second control valve 2011 comes from a first port 1906 in the cylinder 1911. The second control valve 2011 has two positions. The first one, as shown by FIG. 20, connects the control line for the first control valve 2006 to a second port 1909 and a third port 1912 in the cylinder 1911. The second position connects a first control line 2009 for the first control valve 2006 to a fourth port 1910 and the third port 1912 in the cylinder 1911. It is assumed that the piston 1901 is at a position as shown by FIG. 19b. The first chamber 1918 is connected to the high-pressure line 2004. The second port 1909 and the fourth port 1910 are connected, through a third chamber 1908, to the return line 2022. Whatever the position of the second control valve 2011, the first control valve 2006 receives low control pressure, and due to the spring load is positioned as shown by FIG. 20, and connects the second chamber 1904 to the line 2021. The piston 1901 accelerates, and moves, to the left, until it reaches the position as shown by FIG. 19a. In this position, the third port 1912 is connected to the first chamber 1918, and to the high-pressure line 2004, while the second port 1909 and the fourth port 1910 are sealed by the piston 1901. The second control valve 2011 connects high pressure to the first control line 2009 of the first control valve 2006, and the last changes its position, and connects the second chamber 1904 to the high-pressure line 2004.

Now, both the second chamber 1904 and the first chamber 1918 are connected to the high-pressure line 2004. As a first face area 1905 is bigger than a second face area 1913, the piston 1901 accelerates to the right, while reducing velocity to the left. If there is no energy loss, the piston 1901 will stop moving at a position as shown by FIG. 19c. In this position, the third chamber 1908 connects between the first port 1906 and a fifth port 1907, which means that high pressure from the high-pressure line 2004 is fed into a second control line 2008, which sets the position of the second control valve 2011 to the position shown by FIG. 20. In this position, the second port 1909 and the third port 1912 are connected to the first control line 2009, which controls the position of the first control valve 2006, and the direction of the force applying on the piston 1901. The piston 1901 keeps accelerating to the right, while moving to the right, until it reaches the position shown by FIG. 19a. In this position, the third chamber 1908 connects a sixth port 1916 and the second port 1909, while sealing the third port 1912, which means that the first control line 2009 is connected to low pressure. The spring toggles the first control valve 2006 to the position as shown by FIG. 20, and the second chamber 1904 is connected to the line 2021. Now there is low pressure in the second chamber 1904, and high pressure in the first chamber 1918, which accelerates the piston 1901 to the left, while moving to the right. If there is no energy loss, the piston 1901 will eventually stop at a position as shown by FIG. 19b. In this position, the first port 1906 is exposed to the second chamber 1904, and delivers low pressure to the second control line 2008, which switches the second control valve 2011 to the position which is not shown by FIG. 20. From here the period starts again. In case of energy loss, if the period starts while the piston 1901 is in position as shown by FIG. 19b, the acceleration to the left while moving to the left, and the acceleration to the right, while moving to the left, are the same as described above, just the stopping position of the piston 1901 will be as shown by FIG. 19d. In this position, the third chamber 1908 does not connect the first port 1906 to the fifth port 1907. The pressure in the second control line 2008 is low, and the second control valve 2011 is in the position set by the spring. The second control valve 2011 connects the fourth port 1910 and the third port 1912 to the first control line 2009. It means that the toggling time of the first control valve 2006, while the piston 1901 moves to the right, will be when the piston 1901 will reach the position shown by FIG. 19e, rather when the position shown by FIG. 19a. In this case, the piston 1901 was accelerated to the right, while moving to the right, along the distance between the second port 1909 and the fourth port 1910 longer than the distance as described above for having no energy loss. This added traveling distance of the piston 1901 charges the Rebound-Effector with extra energy, which compensates for the energy loss.

The Rebound-Effectors, as described above, are very energy-efficient. The invested energy to accelerate the piston 215 to the left, during phase 1, is taken back while accelerating to right, during phase 2, and stored in the first accumulator 123. The invested energy to accelerate the piston 215 to the right, during phase 3, is taken back while accelerating to left, during phase 4, and stored in the first accumulator 123. Even the relatively low pressure hydraulic liquid in the first line 126 is recycled between the second and the third driving chambers 214 and 218 and the second accumulator 125. If there is no external energy transmitting, and neglecting the non-ideal functionality of the hydraulic system, and the friction, and if the control system will keep functioning—the Rebound-Effector will oscillate forever.

The Rebound-Effectors, as described above, include the features:
1. Non-harmonic, no "natural frequency" nor "resonance" movement of the back and forth oscillating weight, or any other component. The oscillating weight is actively loaded by the driving force which is externally controlled.
2. Asymmetric forces. The force to one direction is stronger than the force to the opposite direction—if the first face area 205 area is different than the second face area 209.
3. Rectangular shape rebound forces—if the accumulators 123 and 125 are much bigger in volume than the maximum volume of the second chamber 214.
4. Built-in driving-pressure line block, in case the piston is out of the operating zone—first chamber 208.
5. Emergency stop—emergency-stop assemblies 128 and 136.
6. Immediate controlled stop—check valves assembly 114, and the fourth control valve 113.
7. Immediate start—as explained above.
8. Active "left" resultant and active "right" resultant operation—controlled by a valve—if the first face area 205 is smaller than two times the second face area 209, and bigger than the second face area 209.
9. Controlled positioning of the piston relative to the cylinder—by the first control valve 132.
10. Energy recovery and reuse—as explained above.
11. Driven by virtually any open flow circuit, and pressure-controlled, hydraulic power pack—as explained above.

Figure 5:
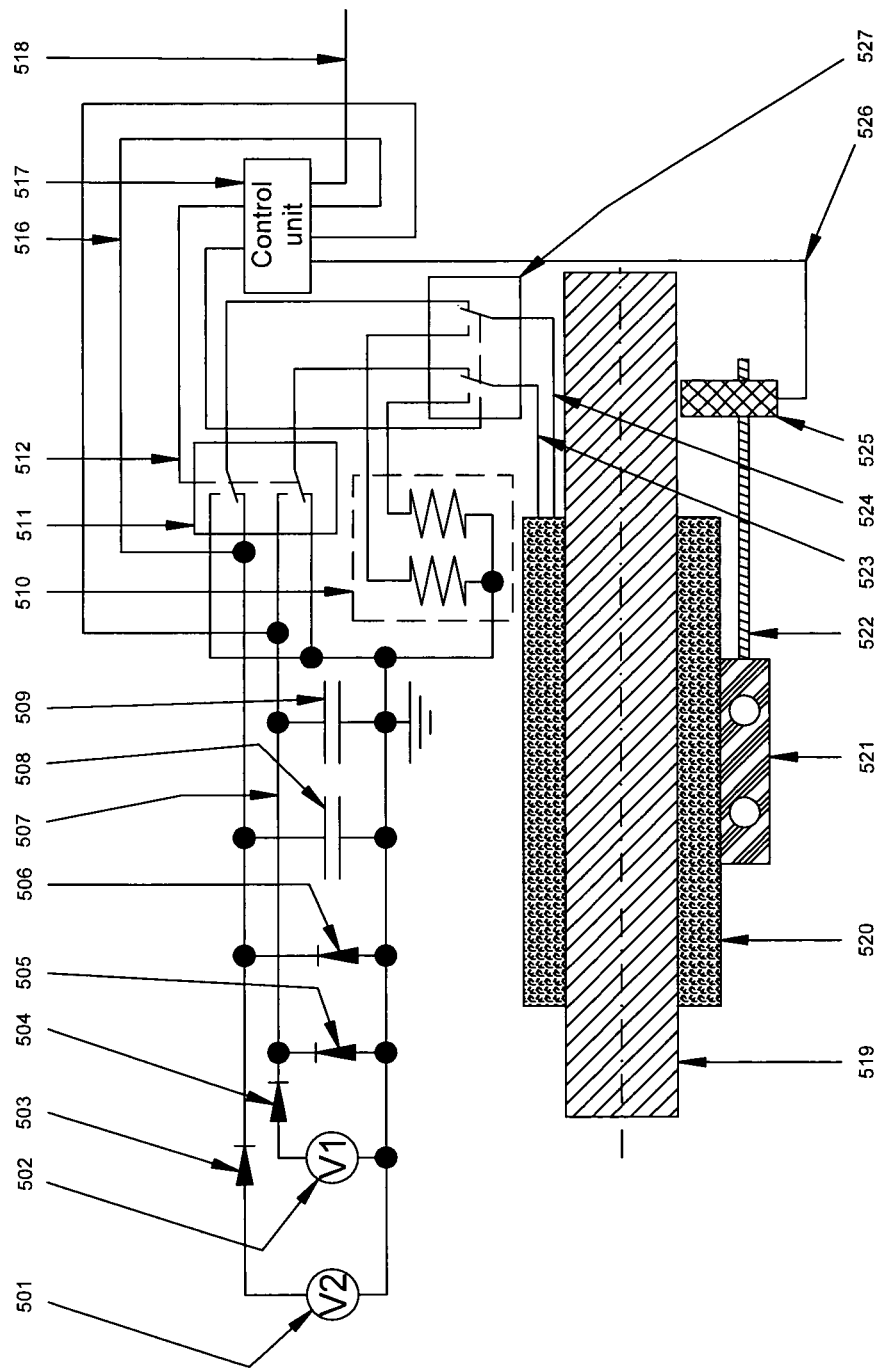
FIG. 5 is a schematic of an electric-operated, electric-controlled Rebound-Effector system.

One more option to realize the Rebound-Effector is by electric, or electromagnetic, driving, and electric control—as shown by FIG. 5.

In this case, a part 520 is a DC solenoid, which drives a part 519, the weight, to the left, or to the right—depending on the current flow direction in a first conduit 523 and a second conduit 524. The part 519 is the oscillating weight. It is accelerated, in a periodic, oscillating way, to the right or to the left. The rebound force created by the acceleration of the weight 519 is the output of the Rebound-Effector, as being induced on a support 521.

If the weight 519 is at the most right designed position, and a first relay 511 and a second relay 527 are in a position as shown by FIG. 5, then the first conduit 523 is connected to system ground, and the second conduit 524 is connected to a first capacitor 508 and a first voltage source V2 501. Due to the current flow through the solenoid 520, there is a force which accelerates the weight 519 to the left. A position sensor 525 measures the location of the weight 519, and sends the information to a control unit 517 through a first cable 526. When the weight 519 reaches a switch position set by the control unit 517, the last sends a signal to the first relay 511, through a second cable 512. Due to this signal, the first relay 511 changes its position, and the second conduit 524 switches to system ground, and the first conduit 523 switches to a second capacitor 509 and a second voltage source V1 502. As the flow direction in conduits 523 and 524 is reversed, the solenoid 520 induces a force to the right. This force accelerates the weight 519 to the right, which slows down the leftward movement of the weight 519, until it looses all its kinetic energy, and stops moving. As the rightward force continues, the weight 519 will start moving, and accelerating, to the right. The rightward movement will accelerate until the weight 519 will reach the position set by the control unit 517. In this position, the control unit 517 sends a signal to the first relay 511 which changes the position of the first relay 511 to the position as shown by FIG. 5. The second conduit 524 is connected to the first capacitor 508, and the first voltage source V2 501, and the first conduit 523 is connected to system ground. As the current flow through the solenoid 520 is reversed, a force to the left applies on the weight 519, which induces acceleration to the left. The leftward acceleration reduces the rightward velocity, until the weight 519 eventually stops. From this point, the above-described process starts again.

The control unit 517 receives information from the position sensor 525, the second voltage source V1 502, the first voltage source V2 501, and from an operator by a third cable 518. The control unit 517 controls the first relay 511 through the second cable 512. The second voltage source V1 502 is protected from the induced noises, and spikes, by the solenoid 520 by diodes 504 and 505. The first voltage source V2 501 is protected from the induced noises, and spikes, by the solenoid 520 by diodes 503 and 506. A sensor support 522 holds the position sensor 525, and connects it to the Rebound-Effector support 521.

If the capacitors 508, and 509, are big enough, the voltage changes in third and fourth conduits 507 and 516, for each position of the first relay 511, and the weight 519, will be neglected. In such a case, each direction force can be considered as a constant force, which means that the acceleration to each direction is constant. The induced force by the solenoid 520 depends on the structure of it, on the properties of the weight 519, and on the voltage between the first and the second conduits 523 and 524. Except for the voltage between the first and the second conduits 523 and 524, all the rest parameters are constant. It means that by using different voltage supplies V2 501, and V1 502, one can control the force, acceleration, and displacement of the weight 519 to each direction. The net, effective, output of the above-described electric-driven Rebound-Effector is much similar to the net, effective, output of the hydraulic-driven Rebound-Effector, as shown by FIG. 3*b* and FIG. 3*d*, and described above. In operating mode, the second relay 527 connects each of the first and the second conduits 523 and 524 to the first relay 511, as shown by FIG. 5. In stop mode, the second relay 527 connects the first and the second conduits 523 and 524 to a load module 510. The load module 510 converts the kinetic energy of the weight 519 into heat. The functionality, and realization, of the position sensor 525, and the control unit 517 are similar to those of the position sensor 220, and the control unit 116, as shown by FIG. 1 and FIG. 2*a*, and described above. The capacitors 508 and 509 may be replaced by any electric energy accumulator. Diodes 503, 504, 505, and 506 may be replaced by any other protecting devices. Voltage sources V1 502 and V2 501 may include pulse, width, modulator, and/or any other means in order to change their output voltage, and/or current. The energy invested to accelerate the weight 519 to the left, during phase 1, is recovered back during phase 2, and stored in the second capacitor 509, while reducing the velocity of the weight 519. The energy invested to accelerate the weight 519 to the right, during phase 3, is recovered, and stored in the first capacitor 508, while reducing the velocity of the weight 519, during phase 4.

The electric-driven Rebound-Effector, as described above, and shown by FIG. 5, includes the features:

1. Non-harmonic, no "natural frequency" nor "resonance" movement of the back and forth oscillating weight, or any other component. The oscillating weight is actively loaded by the driving force which is externally controlled.
2. Asymmetric forces. The force to one direction is stronger than the force to the opposite direction—if the first voltage source V2 501 is different than the second voltage source V1 502.
3. Rectangular shape rebound forces—if capacitors 508 and 509 are big enough, and/or the output impedances of the voltage sources V2 501 and V1 502 are low enough.
4. Built-in driving current source break out, in case the weight 519 is out of the operating zone—not shown by FIG. 5.
5. Emergency stop—not shown by FIG. 5.
6. Immediate controlled stop—emergency-load assembly 510.
7. Immediate start—as explained above.
8. Active "left" resultant and active "right" resultant operation—controlled by a switch—not shown by FIG. 5.
9. Controlled positioning of the piston relative to the cylinder—not shown by FIG. 5.
10. Energy recovery and reuse—as explained above, if capacitors 508 and 509 are big enough.
11. Driven by virtually any DC current source.

Figure 6:
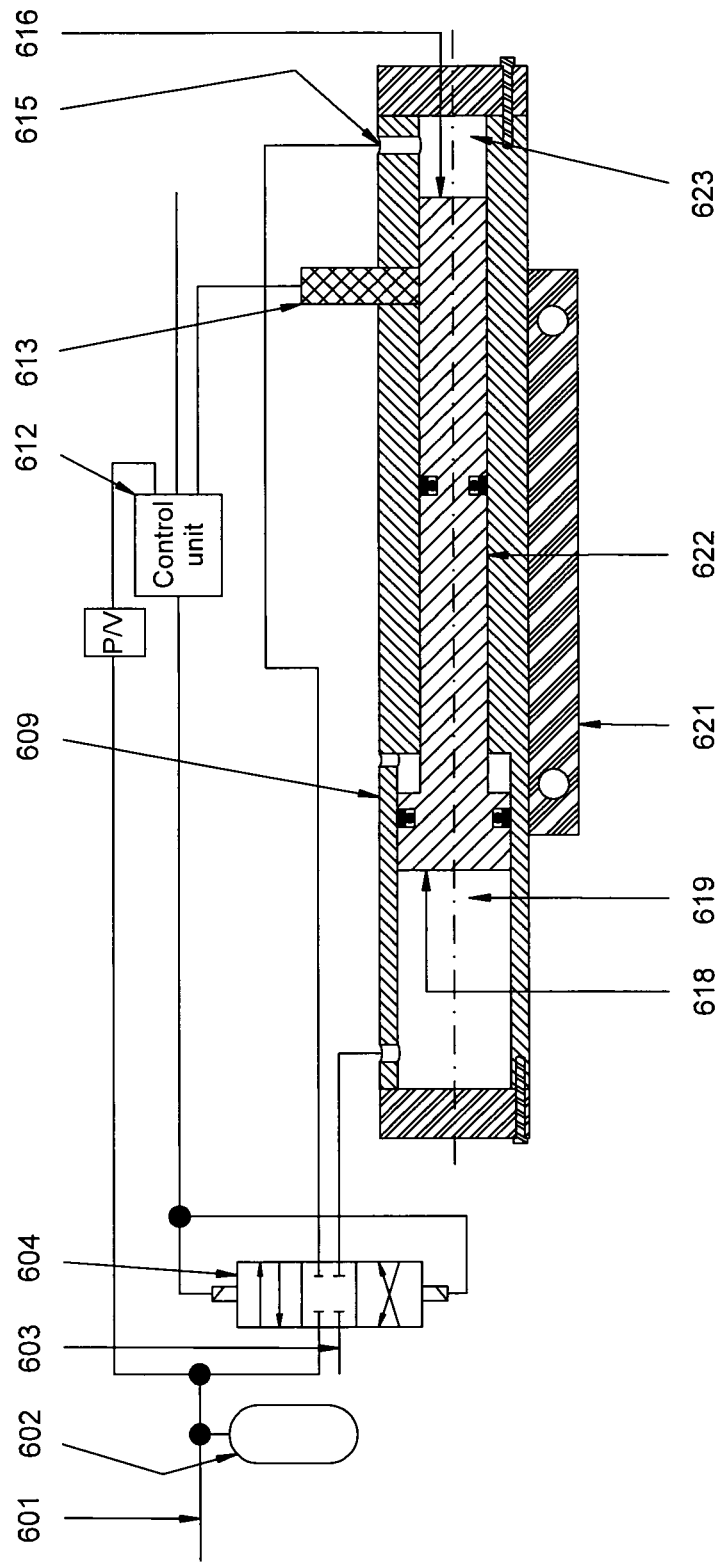
FIG. 6 is a schematic of a pneumatic-operated, electric-controlled Rebound-Effector system.

A different option to realize the Rebound-Effector is by applying compressed air pressure, and electric control—as being shown by FIG. 6.

In this case, a piston 622 is accelerated, periodic and back and forth oscillating, inside a cylinder 609, and serves as a weight that creates the rebound forces, which are induced on a support 621. A first line 601 supplies compressed air, while an accumulator 602 stores compressed air. A second line 603 is open to the atmosphere.

It is assumed that the piston 622 right side is next to a first port 615, as shown by FIG. 6, and that the pressure in the compressed-air accumulator 602, and in the compressed-air supply line 601 are within the operation range, and that a control valve 604 is in the position that connects a first chamber 623 to the compressed-air supply line 601, and a second chamber 619 to the second line 603. In such a case, a force equal to a first face area 616 times the pressure in the compressed-air supply line 601, minus the pressure in the second chamber 619 times a second face area 618, and minus the friction, accelerates the piston 622 to the left. This acceleration continues until the left side of the piston 622 crosses a position sensor 613. The position sensor 613 sends a signal to a control unit 612, and the last changes the position of the control valve 604 as the first chamber 623 is connected to the second line 603, and the second chamber 619 is connected to the compressed-air supply line 601. A force equal to the second face area 618 times the pressure in the compressed-air supply line 601, minus the first face area 616 times the pressure in the first chamber 623, and minus the friction, accelerates the piston 622 to the right, while moving to the left, reducing the speed of the piston 622, until the last stops moving. As the pneumatic force keeps being to the right, the piston 622 accelerates to the right, while moving to the right, until it crosses the position sensor 613. At this moment, the position sensor 613 sends a signal to the control unit 612, and the last changes the position of the control valve 604 as the first chamber 623 is connected to the compressed-air supply line 601, and the second chamber 619 is connected to the second line 603. The force applying on the piston 622 is the pressure in the compressed-air supply line 601 times the first face area 616 minus the pressure in the second chamber 619 times the second face area 618, and minus the friction. The piston 622 accelerates to the left, while moving to the right, until it eventually stops, and starts moving to the right at the same acceleration to the right. From here, the period starts again.

The control unit 612 and the position sensor 613 have virtually the same realization, and the same functionality, as above-described for the control unit 116, and the position sensor 220, and shown by FIG. 1, and FIG. 2a. The position of the control valve 604, as shown by FIG. 6, is for breaking the movement of the piston 622. The invested energy in accelerating the piston 622 to the left, during phase 1, is recovered during phase 2, while reducing the velocity of the piston 622, and stored in the accumulator 602. The invested energy in accelerating the piston 622 to the right, during phase 3, is recovered, while reducing the velocity of the piston 622, during phase 4.

The compressed-air pressure driven Rebound-Effector, as described above, and shown by FIG. 6, includes the features:
1. Non-harmonic, no "natural frequency" nor "resonance" movement of the back and forth oscillating weight, or any other component. The oscillating weight is actively loaded by the driving force which is externally controlled.
2. Asymmetric forces. The force to one direction is stronger than the force to the opposite direction—if the second face area 618 is different than the first face area 616.
3. Rectangular shape rebound forces—if the accumulator 602 is big enough, and/or the output resistance of the compressed-air pressure line 601 is low enough.
4. Built-in compressed-air pressure supply break out, in case the piston 622 is out of the operating zone—left most of the second chamber 619, and right most of the first chamber 623, as shown by FIG. 6.
5. Emergency stop—left most of the second chamber 619, and right most of the first chamber 623, as shown by FIG. 6.
6. Immediate controlled stop—the center position of the control valve 604.
7. Immediate start—as explained above.
8. Active "left" resultant and active "right" resultant operation—if the second face area 618 area is less than two times the first face area 616, and bigger than the first face area 616.
9. Controlled positioning of the piston relative to the cylinder—not shown by FIG. 6.
10. Energy recovery and reuse—as explained above, if the accumulator 602 is big enough.
11. Driven by virtually any compressed air generator.

FIG. 7 shows a Rebound-Effector which has an electric solenoid 704 and a spring 701. This Rebound-Effector uses electromagnetic force to accelerate a weight 702 to the left, and the spring 701 to accelerate the weight 702 to the right. One more option is to use the electromagnetic force to accelerate the weight 702 to the left, and to the right, and to use the spring 701 in order to increase the acceleration to the right, and to decrease the acceleration to the left. The driving electric parts, the weight 702 stop device, as well as the control, are not shown by FIG. 7.

FIG. 8 shows a Rebound-Effector which has an electric solenoid 805 and gas chamber 802. This Rebound-Effector uses electromagnetic force to accelerate a weight 803 to the left, and the compressed gas in the chamber 802, and an accumulator 801, to accelerate the weight 803 to the right. One more option is to use the electromagnetic force to accelerate the weight 803 to the left, and to the right, and to use the compressed gas in the chamber 802, and the accumulator 801, in order to increase the acceleration to the right, and decrease acceleration to the left. The driving electric parts, the weight 803 stop device, as well as the control, are not shown by FIG. 8.

Figure 9:
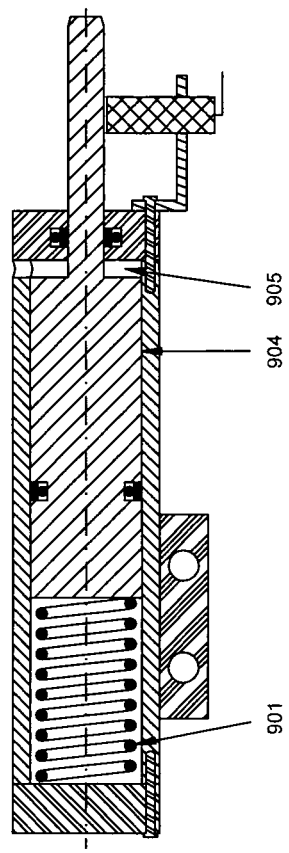
FIG. 9 is a schematic of a hydraulic/mechanic-operated Rebound-Effector.

FIG. 9 shows a Rebound-Effector which accelerates a weight 904 to the left by hydraulic fluid and to the right by a spring 901. The hydraulic fluid supply to a chamber 905, the stop device for weight 908, and the control are not shown by FIG. 9.

Figure 10:
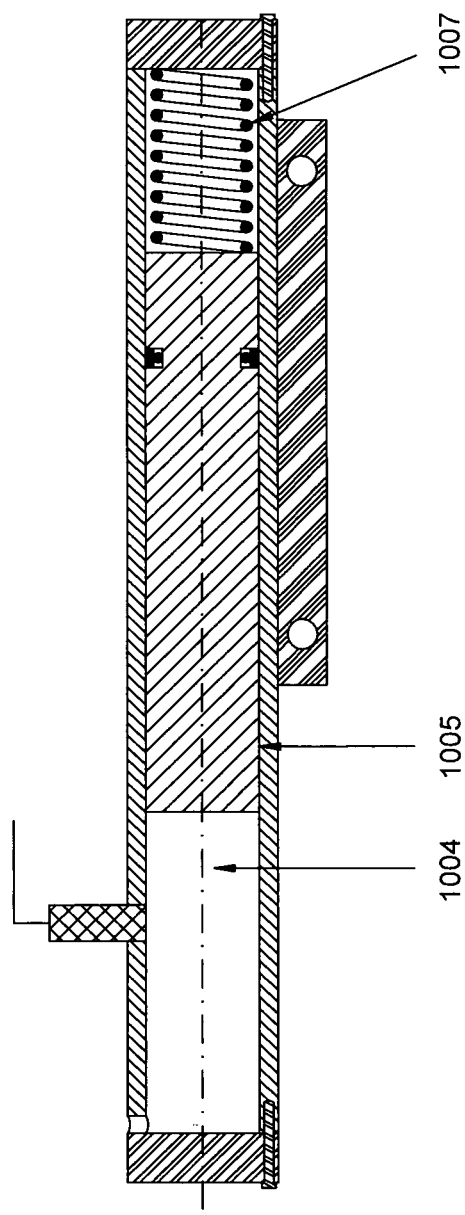
FIG. 10 is a schematic of a pneumatic/mechanic-operated Rebound-Effector.

FIG. 10 shows a Rebound-Effector which accelerates a weight 1005 to the left by a spring 1007, and to the right by compressed air in a chamber 1004. The pneumatic compressed-air supply to the chamber 1004, and the stop device for the weight 1005, as well as the control, are not shown by FIG. 10.

The composite Rebound-Effector, as described above, and shown by FIG. 7, FIG. 8, FIG. 9, and FIG. 10, also some components, and functions, which are not shown, include the features:
1. Non-harmonic, no "natural frequency" nor "resonance" movement of the back and forth oscillating weight, or any other component. The oscillating weight is actively loaded by the driving force which is externally controlled.
2. Asymmetric forces.
3. Rectangular shape rebound forces.
4. Built-in driving supply break out, in case the weight is out of the operating zone.
5. Emergency stop.
6. Immediate, controlled stop.
7. Immediate start.
8. Active "left" resultant and active "right" resultant operation.
9. Controlled positioning of the weight relative to the housing.
10. Energy recovery and reuse.
11. Driven by virtually any relevant power source.

The Rebound-Effector may function as a standalone Rebound-Effector, or in a group, or groups, to achieve stronger rebound forces, moments, and/or combinations of forces and/or moments.

Figure 11:
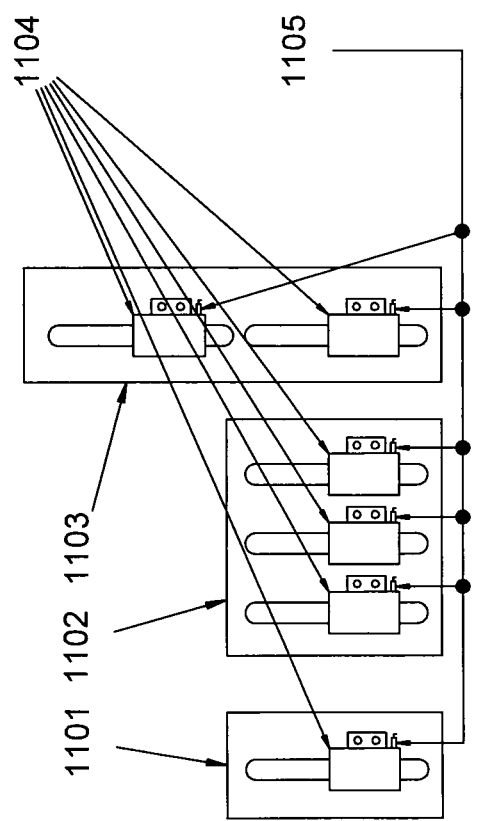
FIG. 11 shows options of paralleling Rebound-Effectors, each of them having separate functions.

FIG. 11 shows two options to parallel Rebound-Effectors 1104. A first assembly 1101 is a standalone Rebound-Effector 1104. A second assembly 1102 includes three Rebound-Effectors 1104, installed in parallel with respect to each other, and side by side. A third assembly 1103 includes two Rebound-Effectors 1104, installed in line, one above the other. Each of the Rebound-Effectors 1104 functions for itself. The coordination in between the Rebound-Effectors 1104, if needed, has to be done by a control system, utilizing position sensors 1105.

Figure 12:
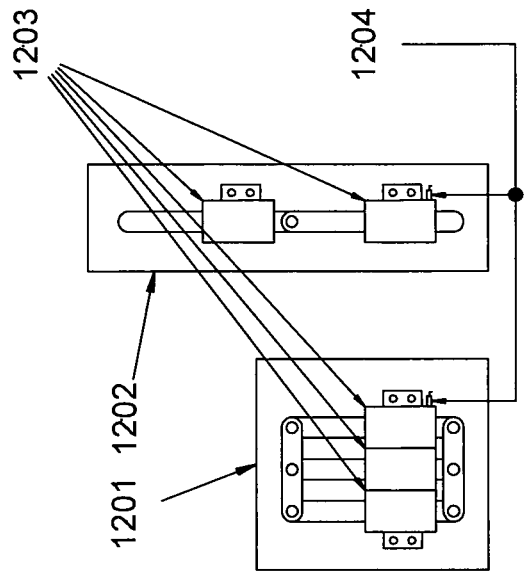
FIG. 12 shows options of mechanically connecting Rebound-Effectors.

FIG. 12 shows two ways to, mechanically, combine Rebound-Effectors 1203. A first assembly 1201 includes three Rebound-Effectors which are mechanically connected to each other, and connected to each other in parallel by the supports, and by the back and forth oscillating weight. The three oscillating weights of the three Rebound-Effectors 1203 move together. A second assembly 1202 includes two Rebound-Effectors 1203 which are mechanically connected to each other, and connected each other in line by the supports, and by the oscillating weights. The two oscillating weights of the two Rebound-Effectors 1203 move together. Each of the assemblies 1201 and 1202 needs one position sensor 1204.

FIG. 13 shows three options of driving an external weight 1305 by a Rebound-Effector or by Rebound-Effectors 1304. A first assembly 1301 includes one Rebound-Effector 1304 driving an external weight 1305. A second assembly 1302 shows two Rebound-Effectors 1304 driving the external weight 1305. A third assembly 1303 shows four Rebound-Effectors 1304 driving the external weight 1305. In case of the assemblies 1301, 1302 and 1303, the effective weight is the weight of the oscillating weight, or weights, of the Rebound-Effector 1304, or Rebound-Effectors 1304, and the weight of the external weight 1305. Each assembly needs one position sensor 1306.

Figure 14:
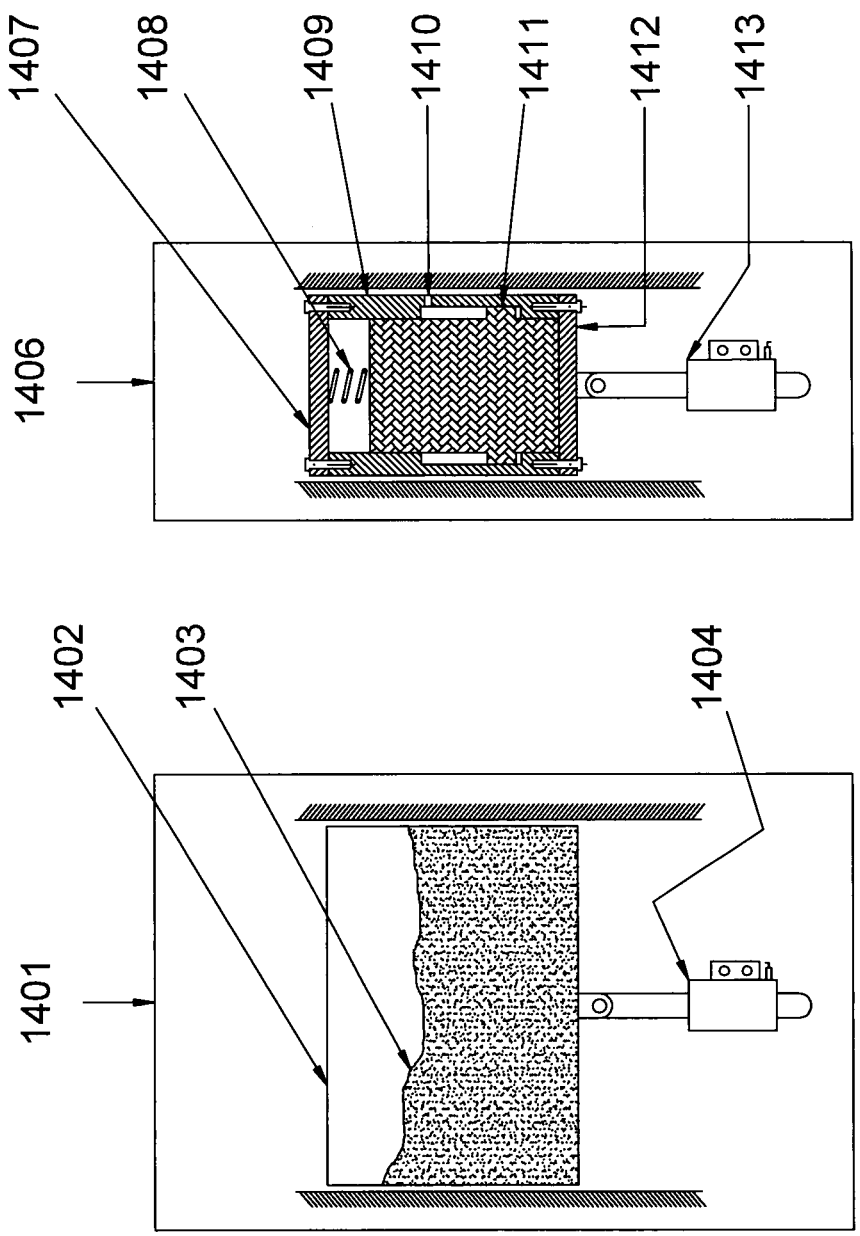
FIG. 14 shows options of the external weight.

FIG. 14 shows two optional ways to realize the external weight by a non-solid structure. A first assembly 1401 shows a Rebound-Effector 1404, connected to a first container 1402, which has material 1403 inside. The material 1403 may be liquid, aggregate, powder, or any kind of material. The first container 1402 may be fully, or partly, loaded with the material 1403. A second assembly 1406 includes a Rebound-Effector 1413 which is connected to an external weight 1407. The external weight 1407 includes a cylinder 1409, an internal piston 1411, and a spring 1408. The internal piston has a shoulder which slides inside a groove in a cylinder 1409, as to perform one sided piston. Once pressure is introduced, to the above cylinder, through a port 1410, the piston is forced to a lower cover 1412 of the cylinder 1409, and actually moves together with a second container 1407 as one unit. If the port 1410 is ventilated, then the piston 1411 can move inside the cylinder 1409, influenced by the accelerations of the Rebound-Effector, and the applied force by the spring 1408.

Figure 15:
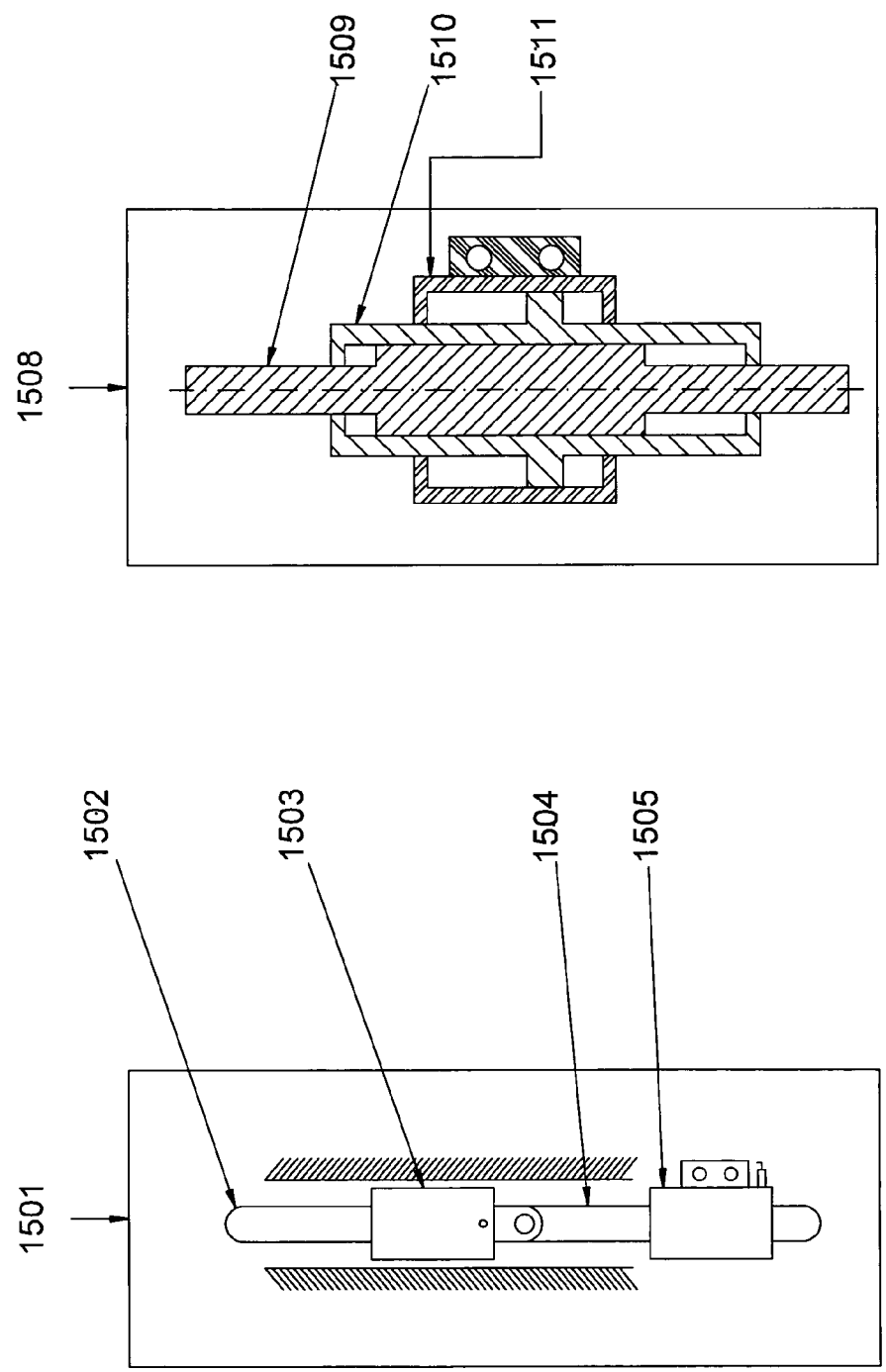
FIG. 15 shows options of cascading, or recursive, Rebound-Effectors.

FIG. 15 shows two ways of cascading, or recursive, connections between Rebound-Effectors. An assembly 1501 includes two Rebound-Effectors 1503 and 1505 connected each other in series way. A first piston 1504 and a second piston 1502 are connected each other head to tail. The movement of the first piston 1504 causes the movement of all Rebound-Effectors 1503 and 1505. When one of the Rebound-Effectors 1503 and 1505 functions by itself, the second piston 1502 is fixed, while the cylinder moves up and down. When both Rebound-Effectors 1503 and 1505 are functioning together—forces are obtained which are the results of the combination of them both.

Another assembly 1508 includes two Rebound-Effectors one inside the other. A part 1510 is a piston for a cylinder 1511, and, at the same time, a cylinder for a piston 1509. This assembly can function in three modes. In mode 1, the piston 1509 moves together with the part 1510. The cylinder 1511 is the cylinder for this mode, while the part 1510 and the piston 1509 are the weight. In mode 2, the cylinder 1511 and the part 1510 move together. In this mode, the piston 1509 is the weight of the Rebound-Effector. In the third mode, the part 1510 and the cylinder 1511 are performing as a Rebound-Effector, while in parallel, the part 1510 and the piston 1509 are performing as a Rebound-Effector as well.

Figure 16:
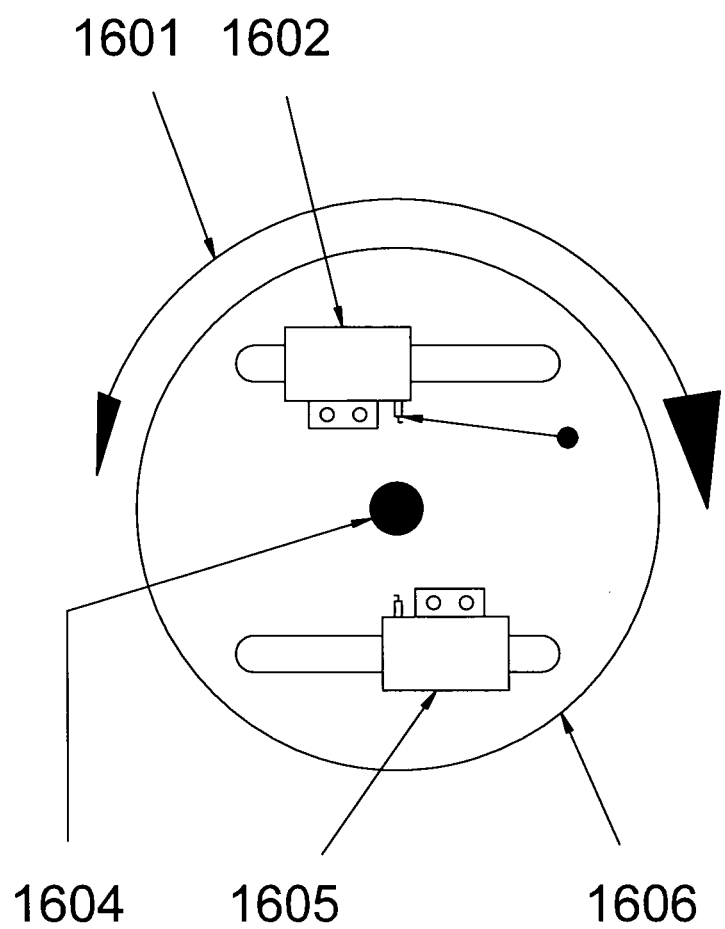
FIG. 16 shows two Rebound-Effectors installed around a rotary axis in order to create a rotary induced moment.

FIG. 16 shows two Rebound-Effectors 1602 and 1605 connected to a rotated disk 1606, in a symmetric way to a rotary axis 1604. Running the two Rebound-Effectors symmetrically to the rotary axis 1604 creates a periodic, back and forth oscillating moment on the rotated disk 1606, as shown by arrows 1601.

Figure 17A:
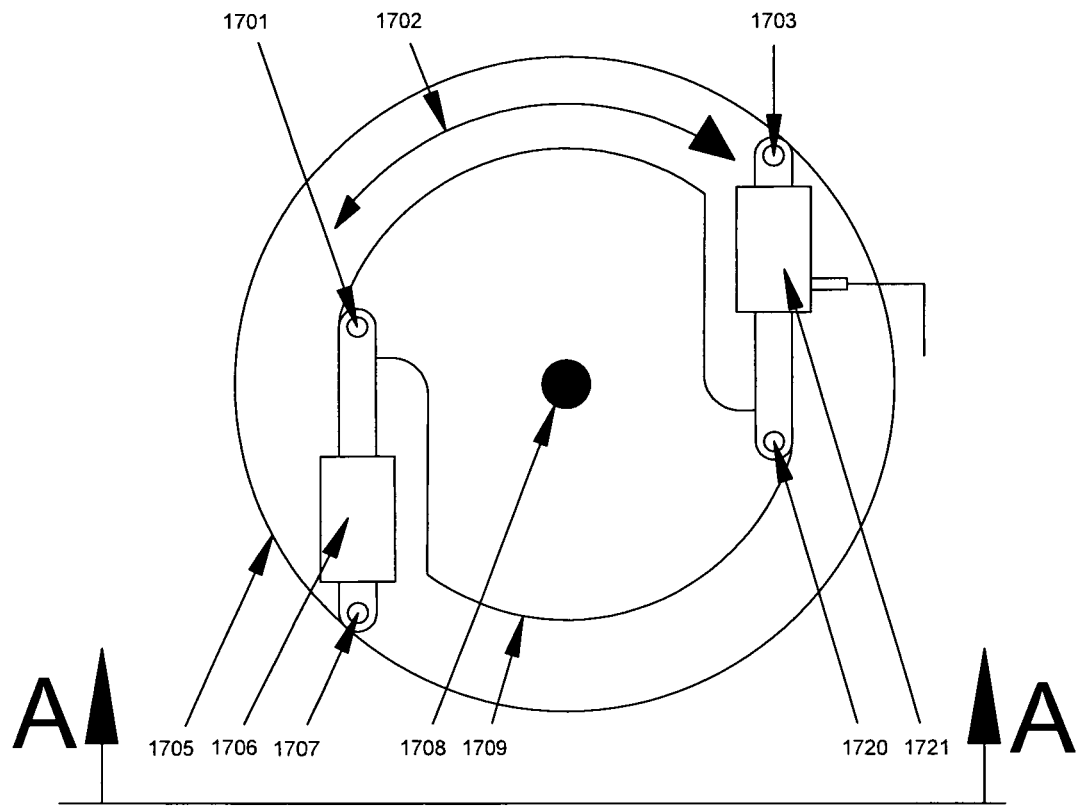
FIG. 17a and FIG. 17b show two Rebound-Effectors rotating an external weight in order to create a rotary induced moment.
Figure 17B:
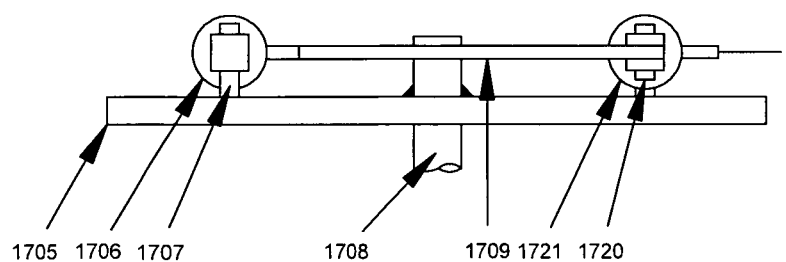

FIG. 17a shows a top view of a rotary disk 1705, which rotates around an axis 1708. Rebound-Effectors 1706 and 1721 are connected to the rotary disk 1705 by pins 1707 and 1703. A rotary weight 1709 freely rotates around the axis 1708, and is connected to the Rebound-Effectors 1706 and 1721 by further pins 1701 and 1720. Running Rebound-Effectors 1706 and 1721 symmetrically to the axis 1708, periodic, back and forth oscillating, rotates the rotary weight 1709, creating periodic, back and forth oscillating moments on the rotary disk 1705, as shown by arrows 1702. FIG. 17b is a horizontal view A-A of the assembly shown by FIG. 17a.

Figure 18:
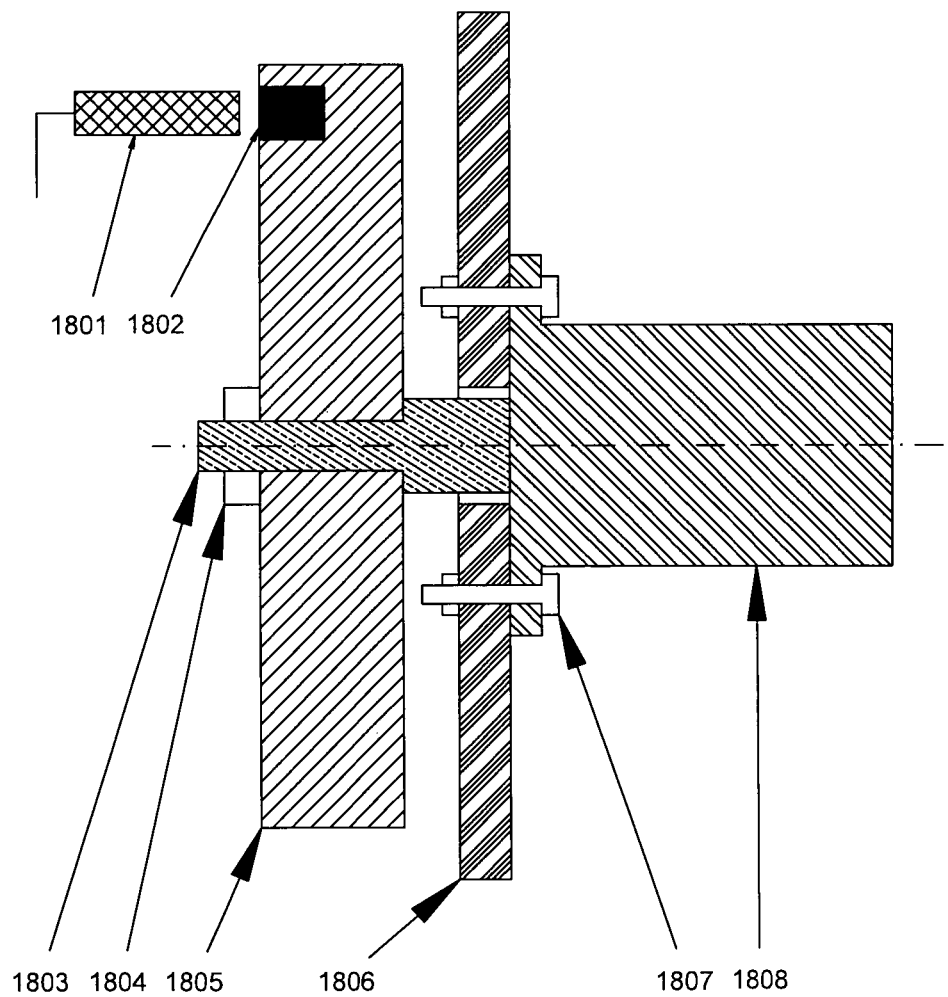
FIG. 18 shows the use of a motor as a Rebound-Effector for creating induced rotary moments.

FIG. 18 shows a motor 1808, which is connected to a base plate 1806 by bolts 1807. A rotary shaft 1803 of the motor 1808 is connected to a weight 1805 by a nut 1804. The weight 1805 includes a magnet 1802. A position sensor 1801 detects the magnet 1802 when the last is next to it. Running the motor 1808 in periodic, back and forth oscillating way, creates a periodic, back and forth oscillating moment on the base plate 1806. The motor 1808 may be realized by any kind of rotary motor, as long as it angularly accelerates the weight 1805 in a periodic, back and forth oscillating, way.

All the assemblies of Rebound-Effector, or Rebound-Effectors, described above, and shown by FIG. 11, FIG. 12, FIG. 13, FIG. 14, FIG. 15, FIG. 16, FIG. 17a, FIG. 17b, and FIG. 18, include the features:
1. Non-harmonic, no "natural frequency" nor "resonance" movement of the back and forth oscillating weight, or any other component. The oscillating weight is actively loaded by the driving force which is externally controlled.
2. Asymmetric forces. The force to one direction is stronger than the force to the opposite direction.
3. Rectangular shape rebound forces.
4. Built-in driving source break out, in case the weight is out of the operating zone.
5. Emergency stop.
6. Immediate, controlled stop.
7. Immediate start.
8. Active "left" resultant and active "right" resultant operation—externally controlled.
9. Controlled positioning of the piston relative to the cylinder.
10. Energy recovery and reuse.
11. Driven by virtually any off-the-shelf, relevant power source.

Reference is made to FIGS. 2a, 2b, 2c, 2d, 2e, 2f, 2g, 5, 7, 8, 9, 19a, 19b, 19c, 19d, and FIG. 19e.

It will be clear to a person skilled in the art that the scope of the invention is not limited to the examples discussed in the foregoing, but that various amendments and modifications thereof are possible without deviating from the scope of the invention as defined in the appended claims. In this respect, for simplicity, the drawings, and the explanations, assume that the cylinder 206, 520, 704, 805, and 1911 is resting, and the piston 215, 519, 702, 803, 904, and 1901 is moving. In real, most of the times, both of them are moving in opposed directions. In the drawings, and the explanations, the cylinder 206, 520, 704, 805, and 1911 of the Rebound-Effector is connected to the support 217 and 521, while in real, the piston 215, 519, 702, 803, 904, and 1901 of the Rebound-Effector may be connected to the support 217 and 521 instead of the cylinder 206, 520, 704, 805, and 1911. In other words, if the piston 215, 519, 702, 803, 904, and 1901 is freely moving—then the cylinder 206, 520, 704, 805, and 1911 is connected to the support 217 and 521, and vice versa, if the cylinder 206, 520, 704, 805, and 1911 is freely moving, then the piston 215, 519, 702, 803, 904, and 1901 is connected to the support 217 and 521.

It is noted that where the terms "left" and "right" are used in the description and the claims, this should not be understood such as to have any restricting effect. However, for sake of clarity, the terms as mentioned are used instead of the more general terms "one side" and "another, opposite side". It will be clear to any skilled person that it is possible to exchange "left" for "right", and "right" for "left" without altering the present invention. This fact is underlined by the fact that where the terms "left" and "right" are used in the claims, quotation marks are used.

The present invention may be summarized as follows. The Rebound-Effector is a mechanism which runs a weight forth and back, by high acceleration. As the weight accelerates, a rebound force is built up. This force is proportional to the product of the weight and the acceleration, and is in opposite direction to the acceleration vector.

The Rebound-Effector has four operational phases. During the first phase, the weight accelerates to the left, while moving to the left. During the second phase, the weight accelerates to the right while moving to the left. During the third phase, the weight accelerates to the right while moving to the right. During the fourth phase, the weight accelerates to the left while moving to the right. The energy inserts into the system, during the first phase, accelerates the weight to the same direction as the movement, being converted into kinetic energy. This kinetic energy is taken back during the second phase, while slowing down the weight, and stored. During the third phase, the stored energy accelerates the weight to the same moving direction, being converted into kinetic energy. This kinetic energy is taken back during the fourth phase, while slowing down the weight, and stored. Neglecting the friction and the non-ideal behavior of the energy conversion, the Rebound-Effector needs an external energy source just for compensating for the real, effective, physical work it performs.

In order to achieve the above behavior, at least one out of the two driving forces—to the right, and/or to the left—must be removed, or disconnected, from the weight during two phases. This force removal mandates a system, which takes care of the occurrence of the driving force, and the duration time. In case the Rebound-Effector induces energy to an external structure, and/or in order to compensate for the internal energy loss, a control system has to take care of filling up the internal energy, as to maintain the needed accelerations, and the needed displacements. This may be done by accelerating the weight during phase 1 and/or phase 3 for a longer distance.

One more task is to keep the weight within a restricted zone. This may be done by position-related switching. The accelerating force to the left may be different than the accelerating force to the right, creating a non-symmetric Rebound-Effector. In most of the cases, the accelerating forces are constant during each of the four phases of the Rebound-Effector operation, which means that the output force has rectangular shape. The Rebound-Effector can change the magnitude, and time period, of the induced forces by changing the energy supply source driving parameters, and by changing the displacements of the weight. The Rebound-Effector may have immediate stop ability. It may stop during each of its four phases. The Rebound-Effector may have immediate start feature. By at most two phases it may reach its full capacity.

In order to avoid mistakes, it must be said that the Rebound-Effector has nothing to do with harmonic, sinusoidal, or resonance movements.

A Rebound-Effector may include more than one weight. A Rebound-Effector assembly may include more than one Rebound-Effector. One or more Rebound-Effectors may be installed around an axis, creating periodic, back and forth oscillating, rebound moments. The energy source for the Rebound-Effector may be, as an example, pneumatic, hydraulic, electric, magnetic, or any combination of them. The Rebound-Effector may be very small—at sub-millimeter in size, or very big—at the range of hundreds of tons in weight.

The invention claimed is:

1. A rebound-effector for inducing periodic, back and forth oscillated, without external reaction, forces and/or moments, comprising:
    a weight accelerated back and forth, wherein in one period time there are four phases of operation, as follows:
        during phase 1 the weight is accelerated to the "left" while moving to the "left";
        during phase 2 the weight is accelerated to the "right" while moving to the "left";
        during phase 3 the weight is accelerated to the "right" while moving to the "right"; and
        during phase 4 the weight is accelerated to the "left" while moving to the "right";
    a driving source for accelerating the weight to the "left", and a driving source for accelerating the weight to the "right",
    wherein, during one period time, at least one driving source is disconnected from, or does not apply on, or does not accelerate the weight for two phases, and
    wherein, during one period time, each of the driving sources is constantly connected to, or applies on, or accelerates the weight, for at least two phases; and
    a system to take care of introducing, and disconnecting, of at least one driving source to and from the weight;
    the rebound-effector being adapted to further store and reuse energy as follows:
        the invested kinetic energy of the weight, during phase 1, is at least partly recovered, and stored during phase 2; and
        the invested kinetic energy of the weight, during phase 3, is at least partly recovered, and stored during phase 4.

2. The rebound-effector as claimed in claim 1 further comprising an emergency stop to receive the kinetic energy of the weight, in case of malfunction, and an immediate, controlled stop, during an excising phase.

3. The rebound-effector as claimed in claim 1, wherein adding, or inserting, or increasing energy to the rebound-effector is done by one or more of the following:
    using longer time, or longer distance, for the weight acceleration during phase 1, and/or phase 3 than is needed for a period without energy adding;
    increasing the driving force on the weight during phase 1 and/or phase 3 than is needed for a period without energy adding; and
    decreasing the driving force on the weight during phase 2 and/or 4 than is needed for a period without energy adding.

4. The rebound-effector as claimed in claim 3, wherein the weight comprises one or more parts.

5. The rebound-effector as claimed in claim 3, wherein the induced forces are symmetric.

6. The rebound-effector as claimed in claim 5, wherein the force to the "left" has the same shape, and magnitude, as the force to the "right", but to the opposite direction.

7. The rebound-effector as claimed in claim 3, wherein the induced forces are asymmetric.

8. The rebound-effector as claimed in claim 7, wherein a control system of the rebound-effector changes from a stronger induced force to the "left" than to the induced force to the "right", to a stronger induced force to the "right" than to the induced force to the "left", and vice versa.

9. The rebound-effector as claimed in claim 7, wherein the force to the "left" has different shape, and/or magnitude, than the force to the "right".

10. The rebound-effector as claimed in claim 3, wherein the induced force to the "left" is stronger than the induced force to the "right".

11. The rebound-effector as claimed in claim 3, wherein the induced forces have rectangular shapes as been seen by a force versus time chart.

12. The rebound-effector claimed in claim 11, wherein the induced forces have asymmetric shapes.

13. The rebound-effector as claimed in claim 12, wherein a control system of the rebound-effector changes from a stronger induced force to the "left" than to the induced force to the "right", to a stronger induced force to the "right" than to the induced force to the "left", and vice versa.

14. The rebound-effector claimed in claim 12, wherein the force to the "right" is stronger than the force to the "left".

15. The rebound-effector as claimed in claim 3, wherein the weight comprises external parts.

16. The rebound-effector as claimed in claim 3, wherein the weight comprises one or more liquids, solids, and powders inside the weight.

17. A rebound-effector for inducing periodic, back and forth oscillating forces and/or moments, without external reaction, comprising:
a weight;
a driving source for applying driving force to the weight, the driving source having a first driving source output and a second driving source output;
a driving source coupling system for introducing, and disconnecting, at least one driving source output to and from the weight; and
an energy storage and recovery system;
wherein the weight is capable of being accelerated back and forth, wherein in one period of time there are four successive phases of operation, as follows:
a first phase during which the weight is accelerated while moving in a first direction;
a second phase during which the weight is decelerated while moving in the first direction;
a third phase during which the weight is accelerated while moving in a second direction; and
a fourth phase during which the weight is decelerated while moving in the second direction;
wherein the first driving source output for applying driving force to the weight in the first direction, and the second driving source output for applying driving force to the weight in the second direction;
wherein, during one period of time, at least one driving source output is disconnected from, or does not apply, driving force to the weight for two phases
wherein, during one period of time, each of the driving source outputs is constantly connected to, or applies, driving force to the weight, for at least two phases;
wherein the driving source coupling system:
during the first phase, constantly connects the first driving source output to the weight;
during the second phase, constantly connects the second driving source output to the weight;
during the third phase, constantly connects the second driving source output to the weight; and
during the fourth phase, constantly connects the first driving source output to the weight; and
wherein the energy storage and recovery system:
at least partly recovering kinetic energy of the weight invested during the first phase and storing it during the second phase; and
at least partly recovering kinetic energy of the weight invested during the third phase and storing it during the fourth phase.

18. The rebound-effector claimed in claim 17, which is adapted to be driven by one or more of the following:
hydraulic fluid pressure;
electric current;
pneumatic pressure; and
a spring.

19. A rebound-effector for inducing periodic, back and forth oscillating forces and/or moments, without external reaction, which rebound-effector comprises:
a weight which is intended to be accelerated back and forth, in a linear and/or angular way, wherein in one period time there are four successive phases of operation, as follows:
a first phase during which the weight is accelerated while moving in a first direction;
a second phase during which the weight is decelerated while moving in the first direction;
a third phase during which the weight is accelerated while moving in a second direction opposite to the first direction; and
a fourth phase during which the weight is decelerated while moving in the second direction;
driving source means having a first driving source output for applying driving force to the weight in the first direction, and a second driving source output for applying driving force to the weight in the second direction, wherein, during one period time, at least one driving source output is disconnected from, or does not apply driving force to the weight for two phases, and wherein, during one period, each of the driving source outputs is constantly connected to, or applies driving force to the weight, for at least two phases;
a driving source coupling system for introducing, and disconnecting, of at least one driving source output to and from the weight, wherein this driving source coupling system comprises coupling means for:
during the first phase, constantly connecting the first driving source output to the weight;
during the second phase, constantly connecting the second driving source output to the weight;
during the third phase, constantly connecting the second driving source output to the weight; and
during the fourth phase, constantly connecting the first driving source output to the weight;
the rebound-effector further comprising energy storage means and energy recovery means which comprise:
first energy transporting means for, during the second phase of a first period, at least partly recovering the kinetic energy of the weight invested from the first driving source output in the weight during the first phase of the first period, and transporting the recovered energy to the energy storage means, and during the third phase of the first period at least partly using the energy from the energy storage means and convert to kinetic energy of the weight by the second driving source output; and
second energy transporting means for, during the fourth phase of the first period, at least partly, recovering the kinetic energy of the weight invested from the second driving source output in the weight during the third phase of the first period, and transporting the recovered energy to the energy storage means, and during the first phase of the subsequent period following the first period at least partly using the energy from the energy storage means and convert to kinetic energy of the weight by the first driving source output.

* * * * *